United States Patent

Kaneko et al.

[11] Patent Number: 6,033,598
[45] Date of Patent: *Mar. 7, 2000

[54] LIQUID-CRYSTAL COMPOSITION AND LIQUID-CRYSTAL DISPLAY ELEMENT

[75] Inventors: Masaharu Kaneko; Masami Kadowaki; Hideki Sato, all of Kanagawa, Japan

[73] Assignee: Mitsubishi Chemical Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/875,524
[22] PCT Filed: Nov. 11, 1996
[86] PCT No.: PCT/JP96/03300
§ 371 Date: Jul. 10, 1997
§ 102(e) Date: Jul. 10, 1997
[87] PCT Pub. No.: WO97/17415
PCT Pub. Date: May 15, 1997

[30] Foreign Application Priority Data

Nov. 10, 1995 [JP] Japan ................................ 7-292560

[51] Int. Cl.[7] .......................... C09K 19/00; C09K 19/30; C09K 19/12
[52] U.S. Cl. ................... 252/299.1; 252/299.63; 252/299.66
[58] Field of Search ........................ 252/299.1, 299.62, 252/299.63, 299.66

[56] References Cited

U.S. PATENT DOCUMENTS

| | | | |
|---|---|---|---|
| 4,985,171 | 1/1991 | Miura et al. | 252/299.1 |
| 5,006,276 | 4/1991 | Kaneko et al. | 252/299.1 |
| 5,026,505 | 6/1991 | Kaneko et al. | 252/299.1 |
| 5,104,572 | 4/1992 | Ozawa et al. | 252/299.1 |
| 5,453,217 | 9/1995 | Kaneko et al. | 252/299.1 |
| 5,560,865 | 10/1996 | Nakagawa et al. | 252/299.01 |
| 5,589,100 | 12/1996 | Graso et al. | 252/299.01 |
| 5,653,912 | 8/1997 | Nakagawa et al. | 252/299.01 |
| 5,683,624 | 11/1997 | Sekiguchi et al. | 252/299.61 |

FOREIGN PATENT DOCUMENTS

| | | |
|---|---|---|
| 4296388 | 10/1992 | Japan . |
| 7199233 | 8/1995 | Japan . |

OTHER PUBLICATIONS

Mol. Cryst. Liq. Cryst., 1993, vol. 225, pp. 197–210.

Primary Examiner—C. H. Kelly
Attorney, Agent, or Firm—Sughrue, Mion, Zinn, Macpeak & Seas, PLLC

[57] ABSTRACT

The present invention provides a guest-host liquid-crystal composition comprising a host liquid-crystal composition containing one or more dichroic dyes, characterized in that the host liquid-crystal composition comprises as the main component a polycyclic compound having three or more rings and having no cyano group in the direction of the molecular axis, the proportion of the polycyclic compound component having three or more rings in the host liquid-crystal composition being 75% by mole or higher, and that the guest-host liquid-crystal composition has an order parameter (S value) of 0.76 or higher. The invention further provides a liquid-crystal display element employing the composition. This guest-host liquid-crystal composition shows excellent dichroism or a high order parameter.

25 Claims, 2 Drawing Sheets

LIQUID-CRYSTAL COMPOSITION AND LIQUID-CRYSTAL DISPLAY ELEMENT

TECHNICAL FIELD

The present invention relates to a liquid-crystal composition for use in display elements, etc., and to a liquid-crystal display element employing the same.

BACKGROUND ART

A guest-host liquid-crystal display element employing a guest-host liquid-crystal composition obtained by mixing a host liquid-crystal composition with one or more dichroic dyes is receiving attention as a reflection type or another display element for use in future potable information apparatus, because of its superiority in viewing angle, brightness, etc.

The display qualities, such as contrast, of this guest-host liquid-crystal display element directly correlate with the dichroism or order parameter of the guest-host liquid-crystal composition used. Hence, the guest-host liquid-crystal composition has hitherto been required to have a high order parameter. In particular, a guest-host liquid-crystal composition having a high order parameter is desired recently which employs a new host liquid-crystal composition such as a fluorine-containing liquid-crystal composition and is usable in a thin-film transistor type liquid-crystal display element (TFT-LCD) and the like.

Improvements of such guest-host liquid-crystal compositions in dichroism or order parameter should be conducted with respect to both of dichroic dyes and host liquid-crystal compositions. However, the host liquid-crystal compositions which have conventionally been investigated or improved in dichroism or order parameter have been substantially limited to those containing as a major component an Np liquid-crystal composition having a bicyclic skeleton structure such as a biphenyl or cyclohexylphenyl skeleton having a cyano group, as described later.

Consequently, in the case of using new liquid-crystal compositions such as the aforementioned fluorine-containing liquid-crystal compositions, conventional common sense does not always hold and the requirements which such a host liquid-crystal composition must satisfy have been unknown. This has made it difficult to develop a guest-host liquid-crystal composition having a high order parameter which contains a fluorine-containing Np liquid-crystal composition or Nn liquid-crystal composition.

The reasons for the above are as follows. Effects of the components and compositions of host liquid-crystal compositions on the dichroism or order parameter of guest-host liquid-crystal compositions were initially investigated with respect to liquid-crystal compositions of the Schiff base type, ester type, or the like. Thereafter, investigations were directed mainly to liquid-crystal compositions containing as a major component a bicyclic Np liquid-crystal composition having a cyanophenyl structure as a skeleton structure, such as Np liquid-crystal compositions of the biphenyl or phenylcyclohexane type having a cyano group in the direction of the molecular axis.

In the above investigations, there was an idea that the nematic/isotropic transition temperature (TNI) of a host liquid-crystal composition employed in a guest-host liquid-crystal composition should be used as an index, because the dichroism or order parameter of the guest-host liquid-crystal composition must depend on the order parameter of the host liquid-crystal composition itself used, and because the order parameter of the host liquid-crystal composition itself must depend on the thermal stability of the liquid-crystal composition. Namely, it was presumed that a guest-host liquid-crystal composition containing a host liquid-crystal composition having a high TNI generally shows high dichroism or a high order parameter.

However, the above presumption does not hold for host liquid-crystal compositions having different makeups, although almost applicable in the case of using host liquid-crystal compositions having similar makeups. Therefore, the TNI of a host liquid-crystal composition has no correlation with the order parameter thereof.

For example, it was reported in *Preprints of the 9th Liquid Crystal Symposium*, p. 159 and in *Mol. Cryst. Liq. Cryst.*, 1993, Vol. 225, pp. 197–210 that order parameter is often far more influenced by structural differences between liquid-crystal components. Furthermore, there are cases where even when the same dichroic dyes are used, liquid-crystal compositions having a low TNI have a higher order parameter than liquid-crystal compositions having a high TNI (see Example 6 and Comparative Example 4 which both will be given later in this specification). It became apparent from the above that the use of TNI as an index for various kinds of liquid crystals is difficult.

Thereafter, investigations on order parameter came to be directed to guest-host liquid-crystal compositions containing as a host liquid-crystal composition the aforementioned bicyclic Np liquid-crystal composition of the biphenyl or phenylcyclohexane type having a cyano group. Specifically, examples of such cyano liquid-crystal compositions containing bicyclic ingredients as major components include liquid-crystal compositions ZLI-1132 and E-7 (both are trade names) manufactured by E. Merck, which have the structures and compositions shown below. This is because the use of these cyano liquid-crystal compositions as host liquid-crystal compositions was found to be effective in imparting not only high contrast but excellent reliability with regard to light stability, thermal stability, storage stability, etc. Thus, the host liquid-crystal compositions used came to be substantially limited to these cyano liquid-crystal compositions. Later investigations shifted to those intended for structural improvements of dichroic dyes.

(Composition of ZLI-1132)

$C_3H_7$—⬡—⌬—CN     24 mol %

$C_5H_{11}$—⬡—⌬—CN     36 mol %

$C_7H_{15}$—⬡—⌬—CN     25 mol %

$C_5H_{11}$—⬡—⌬—⌬—CN     15 mol %

-continued (Composition of E-7)

C₅H₁₁—⟨⟩—⟨⟩—CN    51 mol %

C₇H₁₅—⟨⟩—⟨⟩—CN    25 mol %

C₈H₁₇O—⟨⟩—⟨⟩—CN    16 mol %

C₅H₁₁—⟨⟩—⟨⟩—⟨⟩—CN    8 mol %

However, from an investigation on the re-entrant phenomenon of liquid-crystal phases and from other investigations, the above kind of Np liquid-crystal compositions having a cyano group were thereafter perceived again to have intense microscopic association among liquid-crystal molecules. Furthermore, reports were made successively on the possibility that these liquid-crystal compositions might have strong microscopic interaction with specific dichroic dyes, in particular anthraquinone dyes. As described above, the conventional investigations on dichroism or order parameter have been partial and limited to those using special liquid-crystal systems containing cyano liquid-crystal compositions and showing intense association.

Currently, the liquid-crystal compositions for use in active drive for TFTs or the like have come to frequently employ compounds having a tricyclic skeleton, such as phenylcyclohexylcyclohexane, as shown in The Chemical Society of Japan, Kikan Kagaku Sōsetsu (The Elements of Chemistry, Quaternary Publication) "Ekishō No Kagaku (Chemistry of Liquid Crystal)", No. 22 (1994), p. 48. These tricyclic compounds have conventionally been scarcely used because they are disadvantageous in that a smectic phase is apt to appear or too high a viscosity results. However, since these tricyclic liquid-crystal compositions for use in TFTs and other applications show weak association with dyes, there has been no guest-host liquid-crystal composition which contains such a polycyclic liquid crystal and shows high dichroism or a high order parameter.

Guest-host liquid-crystal compositions containing new host liquid-crystal compositions such as fluorine-containing liquid-crystal compounds have a problem that they often are considerably inferior in the dichroism of anthraquinone dyes, many of which are included in important blue dyes, to guest-host liquid-crystal compositions containing the above-described Np liquid-crystal compositions having a cyano group. Because of the above problem, the idea that the cyano liquid-crystal compositions described above have strong microscopic interaction with anthraquinone dyes and thus greatly influence high dichroism came to be supported.

Thereafter, as a result of trials and errors, the above-described decrease in dichroism of anthraquinone dyes was found to be relatively small in fluorine-containing liquid-crystal composition ZLI-4792 (trade name, manufactured by E. Merck) among other fluorine-containing liquid-crystal compositions. Although the liquid-crystal composition available under the above trade name has come to be used as a common fluorine-containing host liquid-crystal composition as shown, e.g., in Examples of JP-A-7-179858 (the term "JP-A" as used herein means an "unexamined published Japanese patent application"), the above prior art liquid-crystal composition is still insufficient in dichroism and contrast.

For example, the anthraquinone dye represented by the following structure:

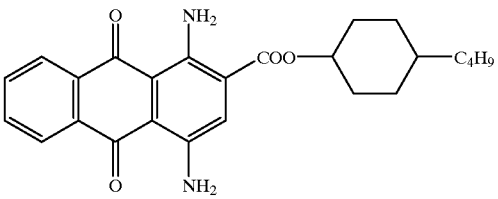

has a relatively high order parameter of 0.78 when used in combination with cyano liquid-crystal composition ZLI-1132, manufactured by E. Merck and having the structures and composition shown above, but has a considerably reduced order parameter of 0.73 when used in combination with fluorine-containing liquid-crystal composition ZLI-4792 (product of E. Merck).

OBJECT OF THE INVENTION

An object of the present invention is to provide a guest-host liquid-crystal composition which contains as a host liquid-crystal composition a liquid-crystal composition such as a fluorine-containing Np liquid-crystal composition or a novel Nn liquid-crystal composition and has an order parameter as high as at least 0.76.

The present inventors have found that a guest-host liquid-crystal composition having further better dichroism or an further higher order parameter can be obtained by using a liquid-crystal composition showing weak association, such as a fluorine-containing liquid-crystal composition comprising polycyclic liquid-crystal components having three or more rings as a main component, in combination with azo or anthraquinone dyes having specific structures. The present invention has been completed based on this finding.

DISCLOSURE OF THE INVENTION

The first aspect of the present invention relates to a guest-host liquid-crystal composition comprising a host liquid-crystal composition containing a dichroic dye, wherein the host liquid-crystal composition comprises, as a main component, a polycyclic compound having three or more rings and having no cyano group in the direction of the molecular axis, the proportion of the polycyclic compound component having three or more rings in the host liquid-crystal composition being 75% by mole or higher, and that the guest-host liquid-crystal composition has an order parameter of 0.76 or higher, preferably 0.80 or higher. The first aspect of the present invention also relates to a liquid-crystal display element employing the guest-host liquid-crystal composition.

The second aspect of the present invention relates to the above guest-host liquid-crystal composition wherein the dichroic dyes comprise at least one member selected from azo dyes represented by the following general formulae [I] to [III], and that the total number of rings represented by:

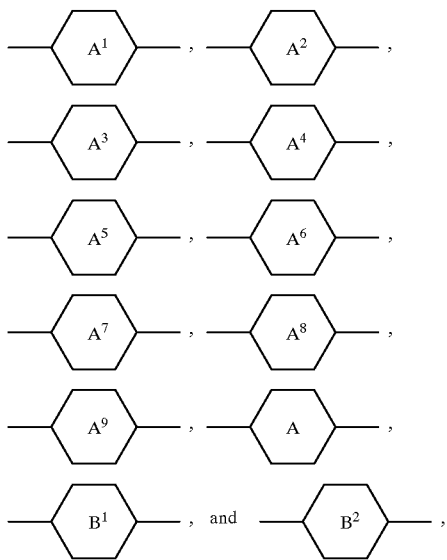

contained in the molecule of the azo dye is 4 or larger and the number of azo bonds (—N=N—) contained in the molecule of the azo dye is from 2 to 6:

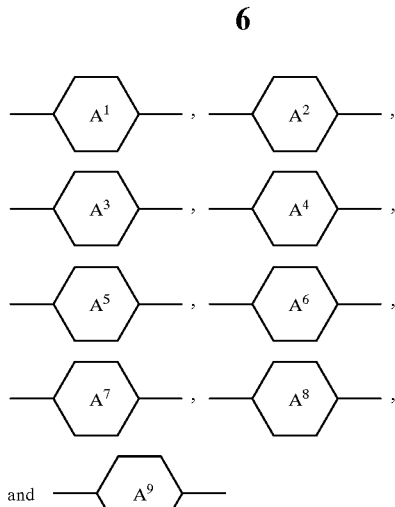

each independently represents

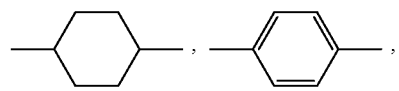

[I]

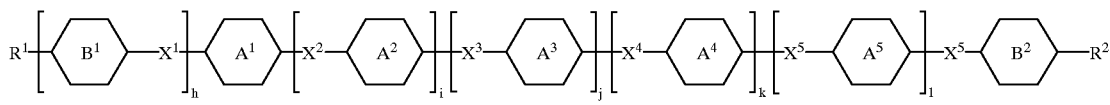

[II]

$D^1$—$D^2$

[III]

provided that $D^1$ and $D^2$ each independently represents

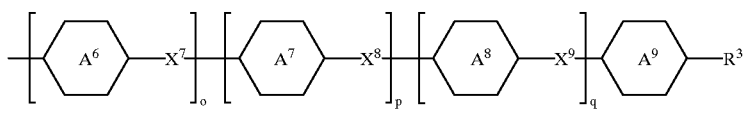

wherein $X^1$ to $X^9$ each independently represents —N=N—, —COO—, —OCO—, —NHCH$_2$—, —CH$_2$NH—, —OCH$_2$—, —CH$_2$O— or a single bond; $Y^1$ and $Y^2$ each represents —COO—, —OCO—, —NHCH$_2$—, —CH$_2$NH—, —OCH$_2$—, —CH$_2$O— or a single bond; $R^1$, $R^2$ and $R^3$ each independently represents a hydrogen atom, an alkyl group, an alkoxyalkyl group, an alkoxy group, a halogen atom, an alkyl, alkoxyalkyl or alkoxy group having a halogen atom as its substituent, or an amino group substituted with any of these groups;

-continued

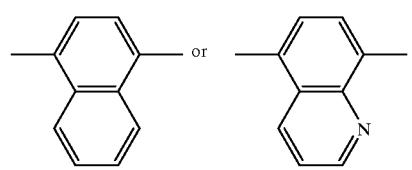

each of which may be substituted with any of —F, —Cl, —CH$_3$, —CF$_3$, —OCH$_3$ and —OCF$_3$;

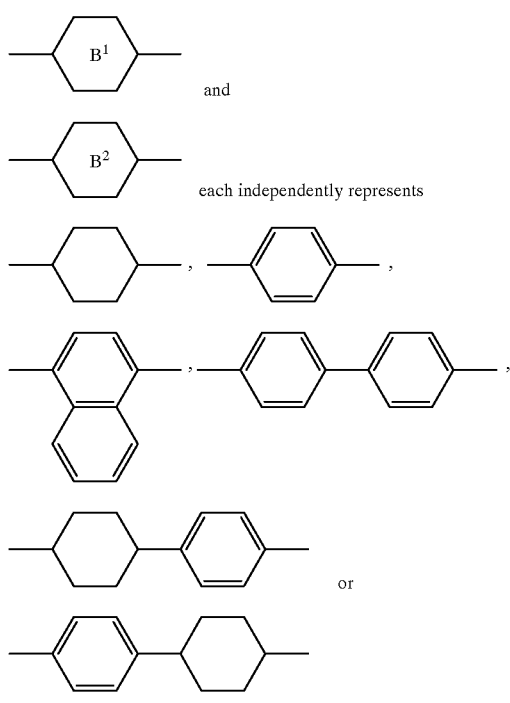

each of which may be substituted with any of —F, —Cl, —CH$_3$, —CF$_3$, —OCH$_3$ and —OCF$_3$;

provided that the groups represented by and adjacent to —N=N— each independently represents each of which may be substituted with any of —F, —Cl, —CH$_3$, —CF$_3$, —OCH$_3$ and —OCF$_3$;

h represents 0 or 1, i represents 0 or 1, j represents 1 to 3, k represents 0 or 1, l represents 1 to 3, o represents 0 or 1, p represents 0 to 2, and q represents 0 to 2; and each of which may be substituted with any of —F, —Cl, —CH$_3$, —CF$_3$, —OCH$_3$ and —OCF$_3$.

The third aspect of the present invention relates to the above guest-host liquid-crystal composition, wherein the dichroic dyes comprise at least one anthraquinone dye represented by the following general formula [IV], wherein the total number of rings represented contained in the substituents ($X^{11}$, $X^{12}$, $X^{13}$, $Y^{11}$, and $Y^{12}$) of the anthraquinone skeleton is 1 or larger:

wherein $X^{11}$, $X^{12}$, and $X^{13}$ each independently represents —NH$_2$,

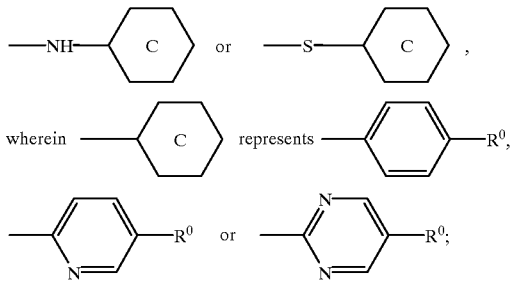

wherein $Y^{11}$ and $Y^{12}$ each independently represents a hydrogen atom, an alkyl group, an alkoxyalkyl group, an alkoxy group, a halogen atom, an alkyl, alkoxyalkyl or alkoxy group having a halogen atom as its substituent,

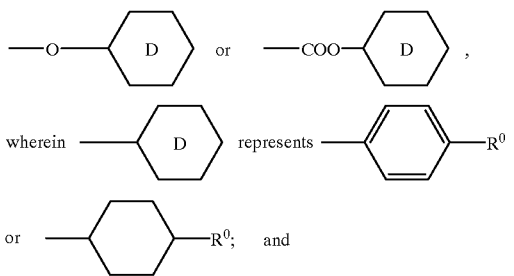

$R^0$ represents a hydrogen atom, an alkyl group, an alkoxyalkyl group, an alkoxy group, a halogen atom, an alkyl, alkoxyalkyl or alkoxy group having a halogen atom as its substituent, or a cyclohexyl or phenyl group which may be substituted with one or more of alkyl groups, alkoxyalkyl groups, halogen atoms and alkoxy groups).

The fourth aspect of the present invention relates to the above guest-host liquid-crystal composition, wherein the dichroic dyes comprise at least one anthraquinone dye represented by the following general formula [V]:

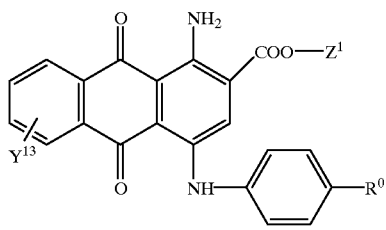

wherein $Y^{13}$ represents a hydrogen atom, an alkyl group, an alkoxyalkyl group, an alkoxy group, a halogen atom, an alkyl, alkoxyalkyl or alkoxy group having a halogen atom as its substituent,

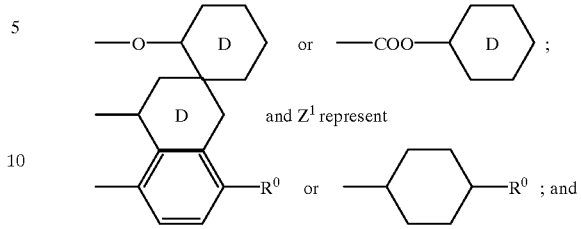

$R^0$ has the same meaning as that in general formula [IV]).

The fifth aspect of the present invention relates to the above guest-host liquid-crystal composition, wherein the dichroic dyes comprise four dichroic dyes of yellow, orange-red, violet, and blue dyes, and the guest-host liquid-crystal composition has a black hue, at least three of the dichroic dyes being azo dyes or anthraquinone dyes represented by any of general formulae [I] to [V] given above.

Preferably, the fifth aspect of the present invention relates to the guest-host liquid-crystal composition, wherein at least one dichroic dye selected from the following group A (yellow), at least one dichroic dye selected from the following group B (orange-red), at least one dichroic dye selected from the following group C (violet), and at least one dichroic dye selected from the following group D (blue):

(Grup A) (yellow)

Dichroic azo dyes represented by the following general formula [VI]

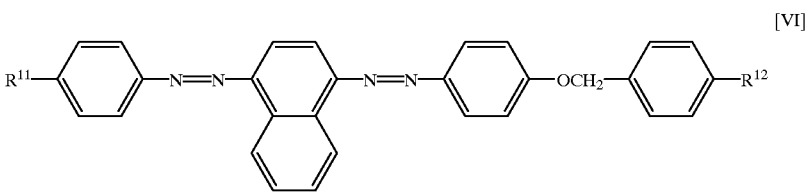

wherein $R^{11}$ represents a hydrogen atom, an alkyl group, an alkoxyalkyl group, an alkoxy group, a halogen atom, or a cyclohexyl or phenyl group wich may be substituted with one or more of alkyl groups, alkixy groups, halogen atoms and alkoxyalkyl groups; and $R^{12}$ represents a hydrogen atom, an alkyl group, an alkoxyalkyl group, an alkoxy group or a halogen atom;

(Group B) (orange-red)

Dichroic azo dyes represented by the following general formula [VII]

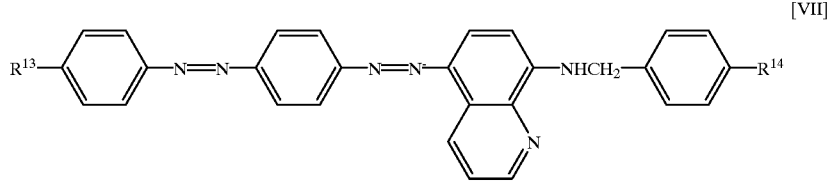

wherein $R^{13}$ and $R^{14}$ represent a hydrogen atom, an alkyl group, an alkoxyalkyl group, an alkoxy group, a halogen atom, or a cyclohexyl or phenyl group which maiy be substituted with one or more of alkyl groups, alkoxy groups, halogen atoms and alkoxyalkyl groups;

(Group C) (violet)

Dichroic azo dyes represented by the following general formula [VIII] and/or dichroic anthraquinone dyes represented by the following general formula [IX]

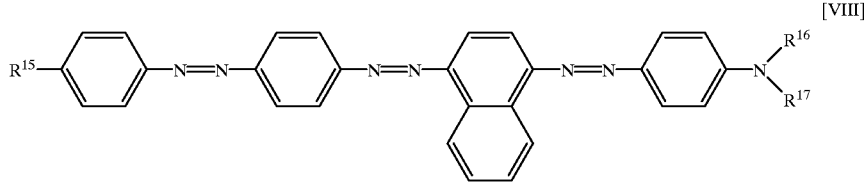

wherein $R^{15}$ represents a hydrogen atom, an alkyl group, an alkoxyalkyl group, an alkoxy group, a halogen atom, or a cyclohexyl or phenyl group which may be substituted with one or more of alkyl groups, alkoxy groups, halogen atoms and alkoxyalkyl groups; and $R^{16}$ and $R^{17}$ represent an alkyl group, an alkoxyalkyl group, an alkoxy group, a halogen atom, or a benzyl or cyclohexylmethyl group which may be substituted with one or more of alkyl groups, alkoxy groups, halogen atoms and alkoxyalkyl groups;

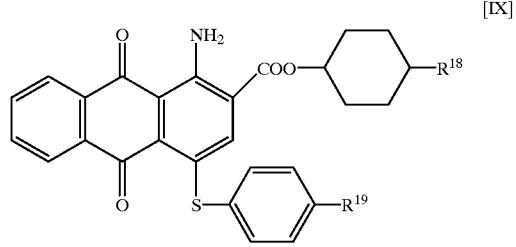

wherein $R^{18}$ and $R^{19}$ each represents a hydrogen atom, a halogen atom, an alkyl group, an alkoxyalkyl group, an alkoxy group, or a cyclohexyl or phenyl group which may have one or more of alkyl groups, alkoxyalkyl groups, halogens and alkoxy groups; and (Group D) (blue)

Dichroic anthraquinone dyes represented by the following general formula [X]

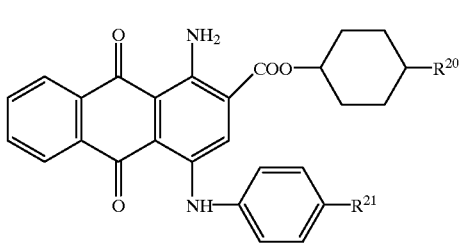

wherein $R^{20}$ and $R^{21}$ represent a hydrogen atom, an alkyl group, an alkoxyalkyl group, an alkoxy group, a halogen atom, or a cyclohexyl or phenyl group which may be substituted with one or more of alkyl groups, alkoxyalkyl groups, halogen atoms and alkoxy groups.

The sixth aspect of the present invention relates to the above guest-host liquid-crystal composition, wherein the dichroic dyes comprise three dichroic dyes of yellow, red-violet and blue dyes and the guest-host liquid-crystal composition has a black hue, at least two of the dichroic dyes being azo and/or anthraquinone dyes represented by any of general formulae [I] to [V] given above.

The seventh aspect of the present invention relates to a reflection type active-matrix liquid-crystal display element which is capable of multicolor-displaying and which comprises a phase transition type guest-host liquid-crystal composition sandwiched between a transparent electrode substrate having a color filter for three primary colors and an electrode substrate having a reflective layer, wherein the liquid-crystal composition comprises the guest-host liquid-crystal composition as provided according to any of the first to the sixth aspects of the present invention.

MODES FOR CARRYING OUT THE INVENTION

The present invention is explained below in detail.

Examples of the liquid-crystal compound having no cyano group in the direction of the molecular axis for use in the present invention include polycyclic Np or Nn liquid-crystal compounds having from three to five rings, preferably three rings, such as compounds (1) to (24) given below.

The term "polycyclic compound having three or more rings" used in the present invention means a compound whose backbone contains, per molecule, three or more ring structures selected from alicyclic structures, aromatic ring structures, and alicyclic or aromatic ring structures containing one or more heteroatoms, e.g., Si.

(1)
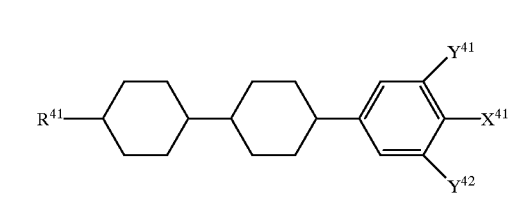

(2)
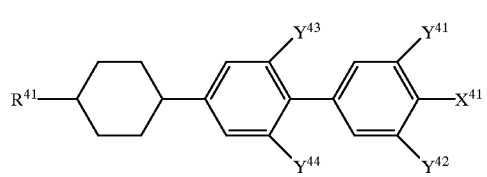

(3)
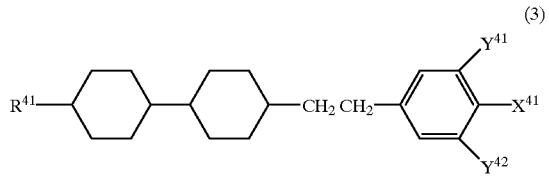

(4)
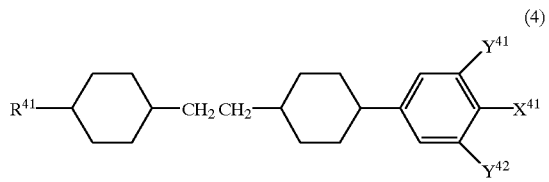

(5)
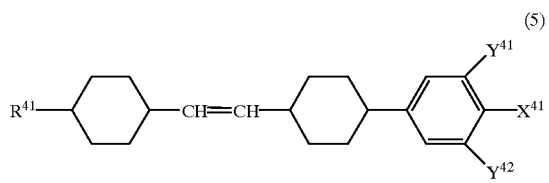

(6)
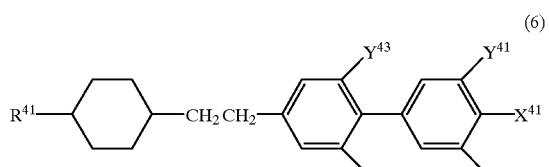

(7)
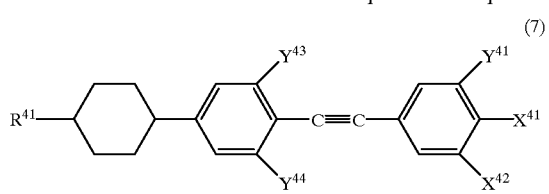

-continued (8)
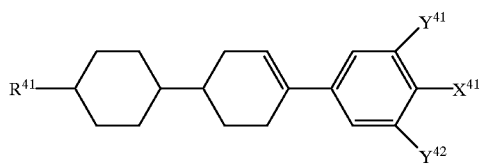

(9)
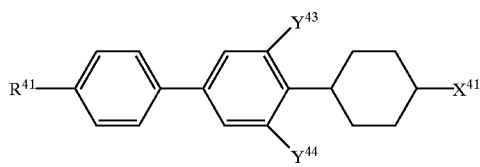

(10)
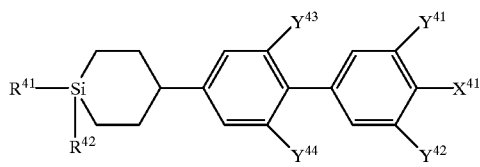

(11)
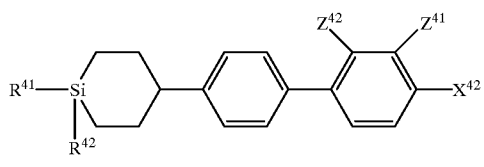

(12)
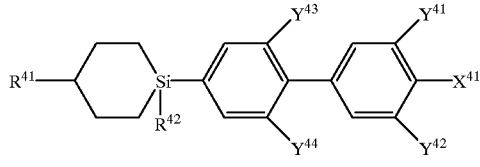

(13)
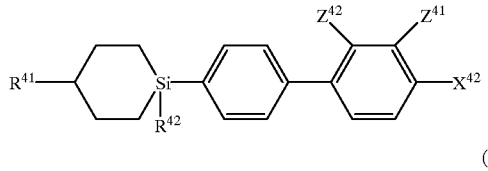

(14)
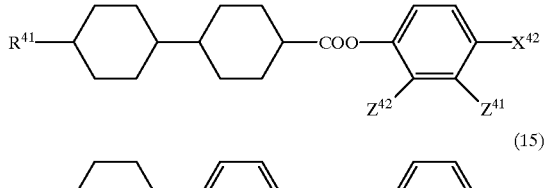

(15)
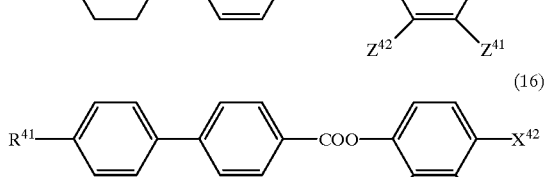

(16)
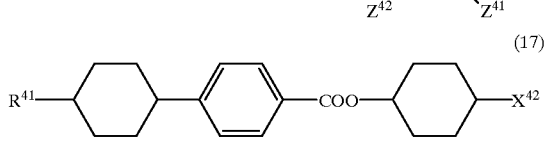

(17)
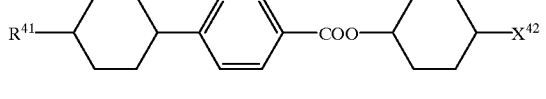

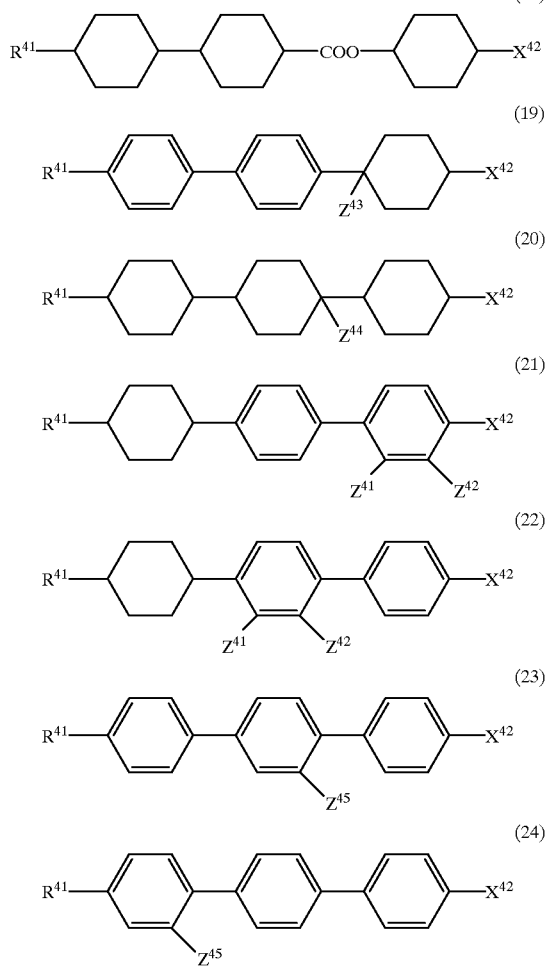

(In the above formulae, $R^{41}$ represents a linear or branched, alkyl, alkoxy, or fluoroalkyl group having 1 to 10 carbon atoms, an alkoxyalkyl, alkenyl, or fluoroalkenyl group having 2 to 11 carbon atoms, or a substituted cyclohexyl or substituted phenyl group having one or more of these groups as substituents. $R^{42}$ represents a hydrogen atom, a methyl group, a chlorine atom, or a fluorine atom. $X^{41}$ represents a halogen atom such as a chlorine or fluorine atom, a fluoroalkyl group having 1 to 10 carbon atoms such as trifluoromethyl, a fluoroalkoxy group having 1 to 10 carbon atoms such as difluoromethoxy or trifluoromethoxy, a fluorochloroalkyl group having 1 to 10 carbon atoms such as fluorochloromethyl, a fluorochloroalkoxy group having 1 to 10 carbon atoms such as fluorochloromethoxy, a fluoroalkenyl group having 2 to 11 carbon atoms, a linear or branched alkyl or alkoxy group having 1 to 10 carbon atoms, or an alkoxyalkyl group having 2 to 11 carbon atoms. $X^{42}$ represents a linear or branched, alkyl, alkoxy, or fluoroalkyl group having 1 to 10 carbon atoms or an alkoxyalkyl, alkenyl, or fluoroalkenyl group having 2 to 11 carbon atoms. $Y^{41}$ to $Y^{44}$ each represents a hydrogen atom or a halogen atom such as a chlorine or fluorine atom. $Z^{41}$ to $Z^{46}$ each represents a hydrogen atom, a halogen atom such as a chlorine or fluorine atom, or a cyano group.)

Among the liquid-crystal compounds shown above, those having a group containing an oxygen atom, such as a fluoroalkoxyalkyl, fluoroalkoxy, alkoxyalkyl, or alkoxy, as a substituent such as $R^{41}$, $X^{41}$, $X^{42}$, etc. tend to reduce the voltage retention necessary for active-matrix operation. In the liquid-crystal composition, the content of these liquid-crystal compounds in the host liquid-crystal composition is preferably 65% by mole or lower, more preferably zero.

Host liquid-crystal compositions comprising liquid-crystal compounds having an ester bond (e.g., the compounds represented by formulae (14) to (18) given above) tend to have a lower order parameter than host liquid-crystal compositions comprising other liquid-crystal compounds having no ester bond. It is hence preferred to regulate the use amount of polycyclic compounds containing an ester bond to 45% by weight or lower based on all liquid-crystal compounds.

In the present invention, the proportion of non-liquid-crystalline ingredients or ingredients having reduced liquid crystallinity such as monotropic compounds in the host liquid-crystal composition is regulated to 25% by mole or lower, preferably 10% by mole or lower.

The proportion of polycyclic compound ingredients having four or more rings to all polycyclic compounds is preferably regulated to 30% by mole or lower. If the proportion thereof exceeds 30% by mole, a smectic phase or a crystalline phase is apt to result, and such a liquid-crystal. composition is unsuitable for use in a liquid-crystal display element of the active operation type. By the use of a host liquid-crystal composition in which the amount of polycyclic compounds having four or more rings has been regulated to 30% by mole or lower, preferably from 0 to 10% by mole, the liquid-crystal composition has a low viscosity and shows satisfactory display element response characteristics, which have a direct correlation with viscosity.

Although liquid-crystal compounds having a high anisotropy of dielectric constant (absolute value) are preferably used, the liquid-crystal composition may contain a liquid-crystal compound having a low anisotropy of dielectric constant (absolute value) for the purposes of regulating the viscosity of the liquid-crystal composition, regulating the range of liquid-crystallinity temperatures, etc.

Examples of the dichroic dyes used in the present invention include various known dyes such as azo dyes, anthraquinone dyes, quinophthalone dyes, perylene dyes, and coumarin dyes. Preferred among these are dichroic azo dyes and dichroic anthraquinone dyes, because guest-host liquid-crystal compositions containing these dyes having a satisfactory order parameter as described in Japan Society for the Promotion of Science, No. 142 Committee, "Liquid-Crystal Device Handbook", Nihon Kogyo Shimbun Co., Ltd. (1989), pp. 724–730.

Examples of the dichroic dyes used in combination with the host liquid-crystal composition include azo dyes represented by general formulae [I] to [III] given above and/or anthraquinone dyes represented by general formulae [IV] to [V] given above. By using a combination of two or more of these dyes, a guest-host liquid-crystal composition can be obtained which has an even better dichroism ratio or an even higher order parameter.

Preferred examples of $R^1$, $R^2$, and $R^3$ in general formulae [I] to [III] given above include a hydrogen atom; linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentoxy, and octoxy; halogen atoms such as fluorine, chlorine, and bromine atoms; alkyl, alkoxyalkyl, or alkoxy groups substituted with one or more halogen atoms, such as fluoroalkyl groups and fluoroalkoxyalkyl groups; and amino groups substituted with one or more of these.

Specific examples of the dichroic dyes represented by general formula [I] include the following.
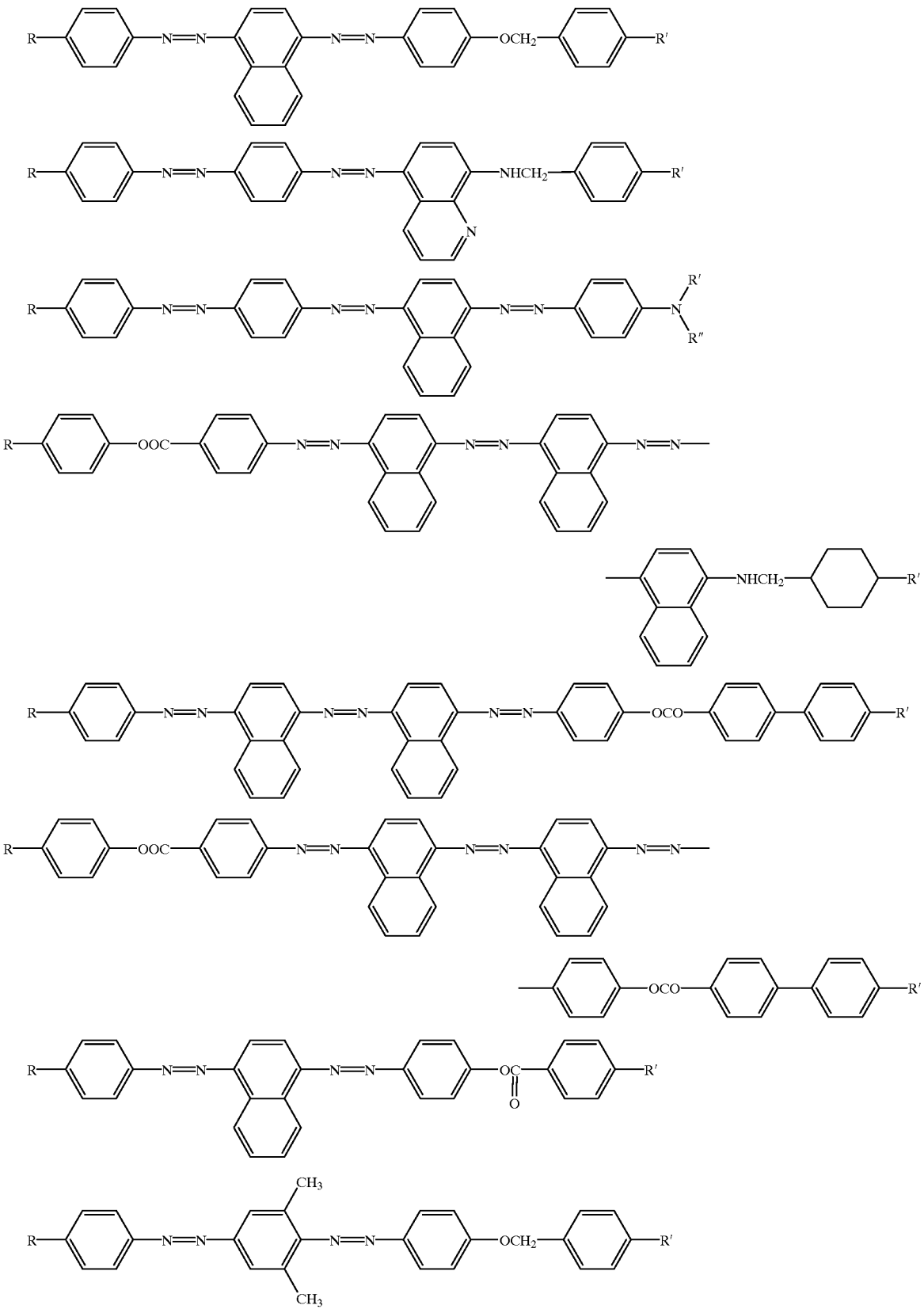

-continued
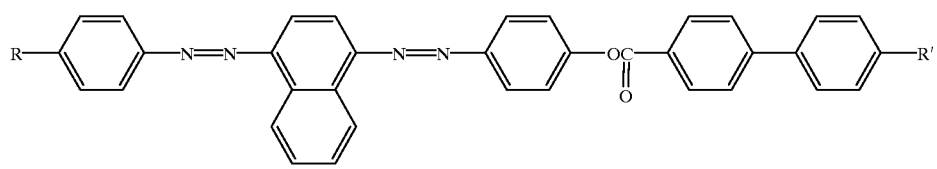
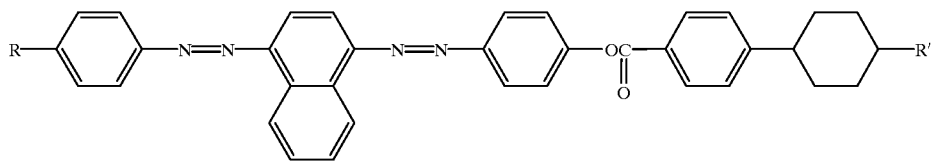
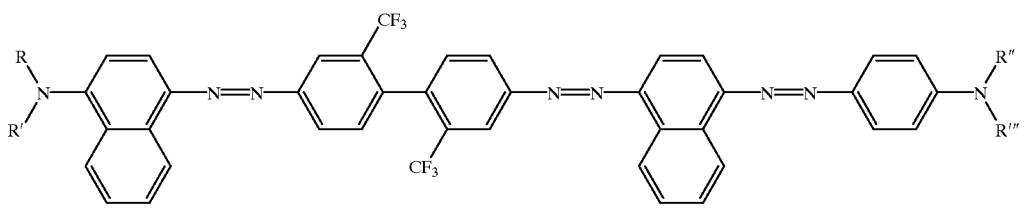
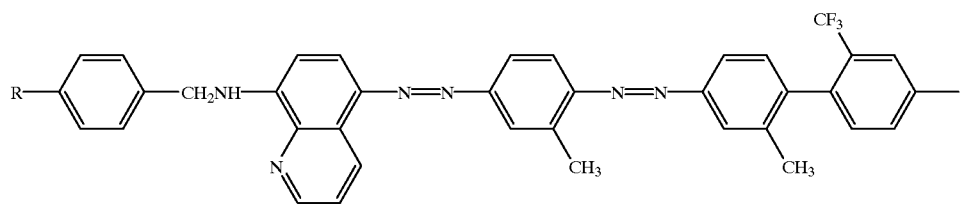
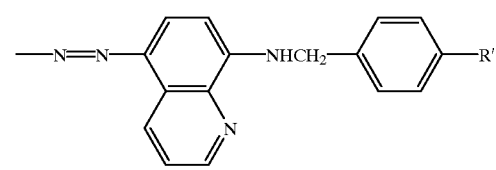
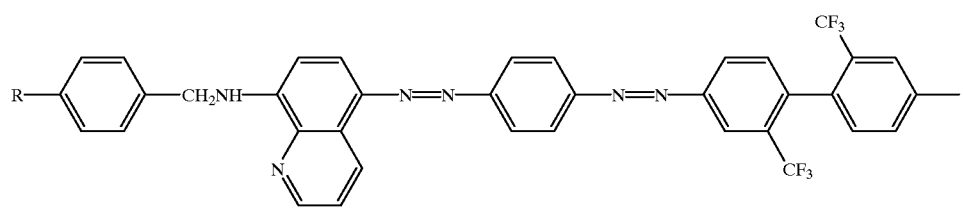
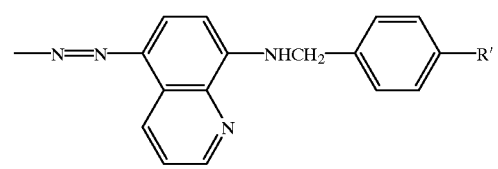
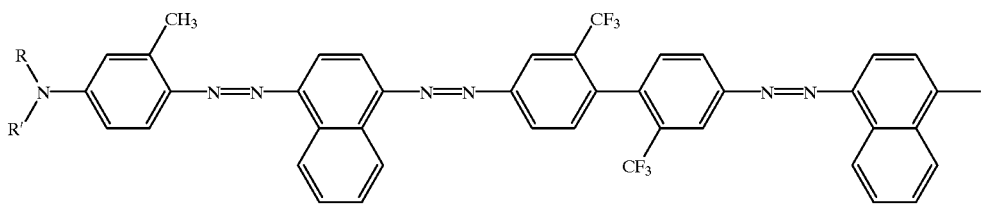
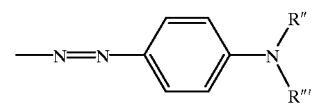

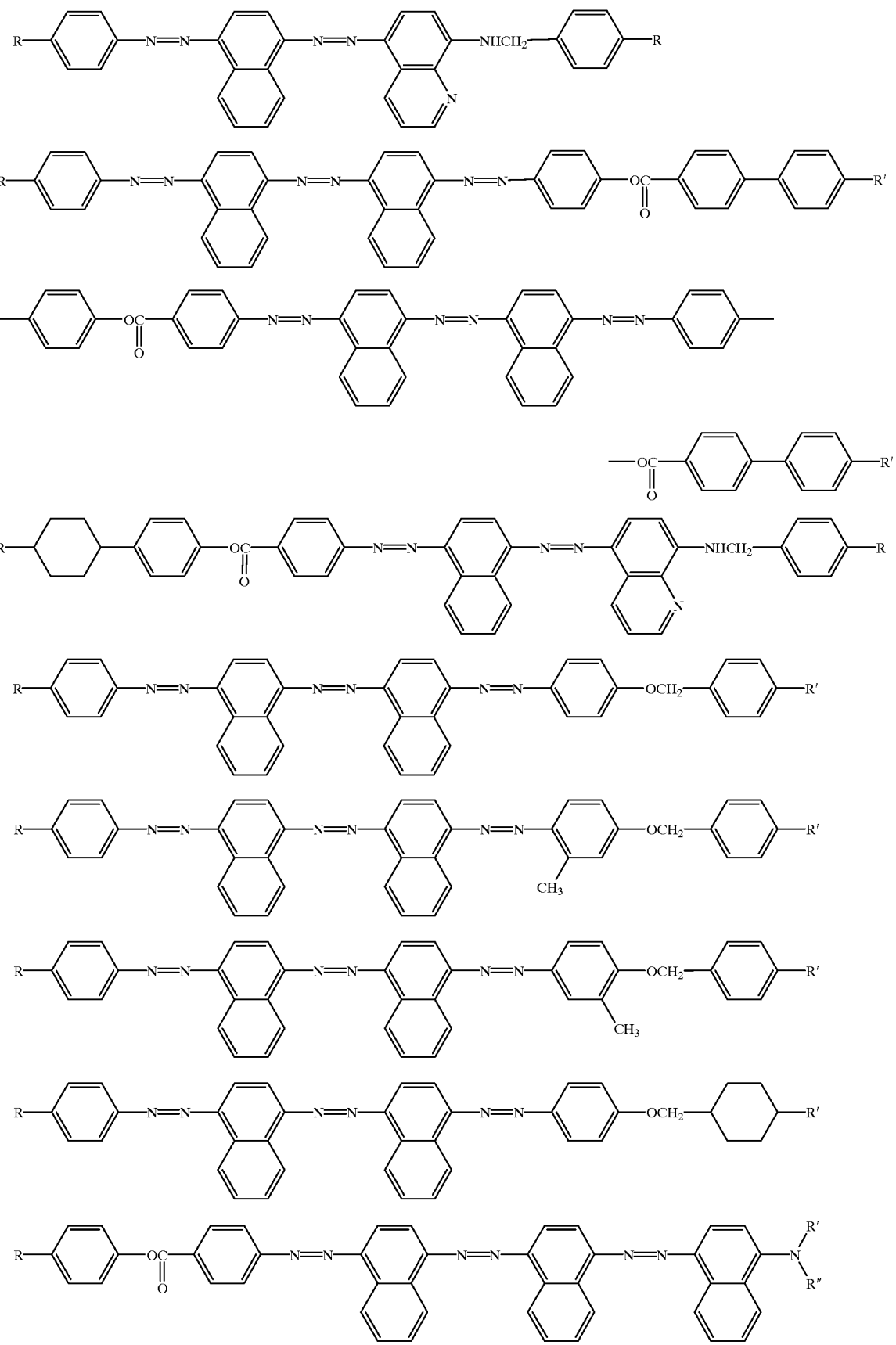

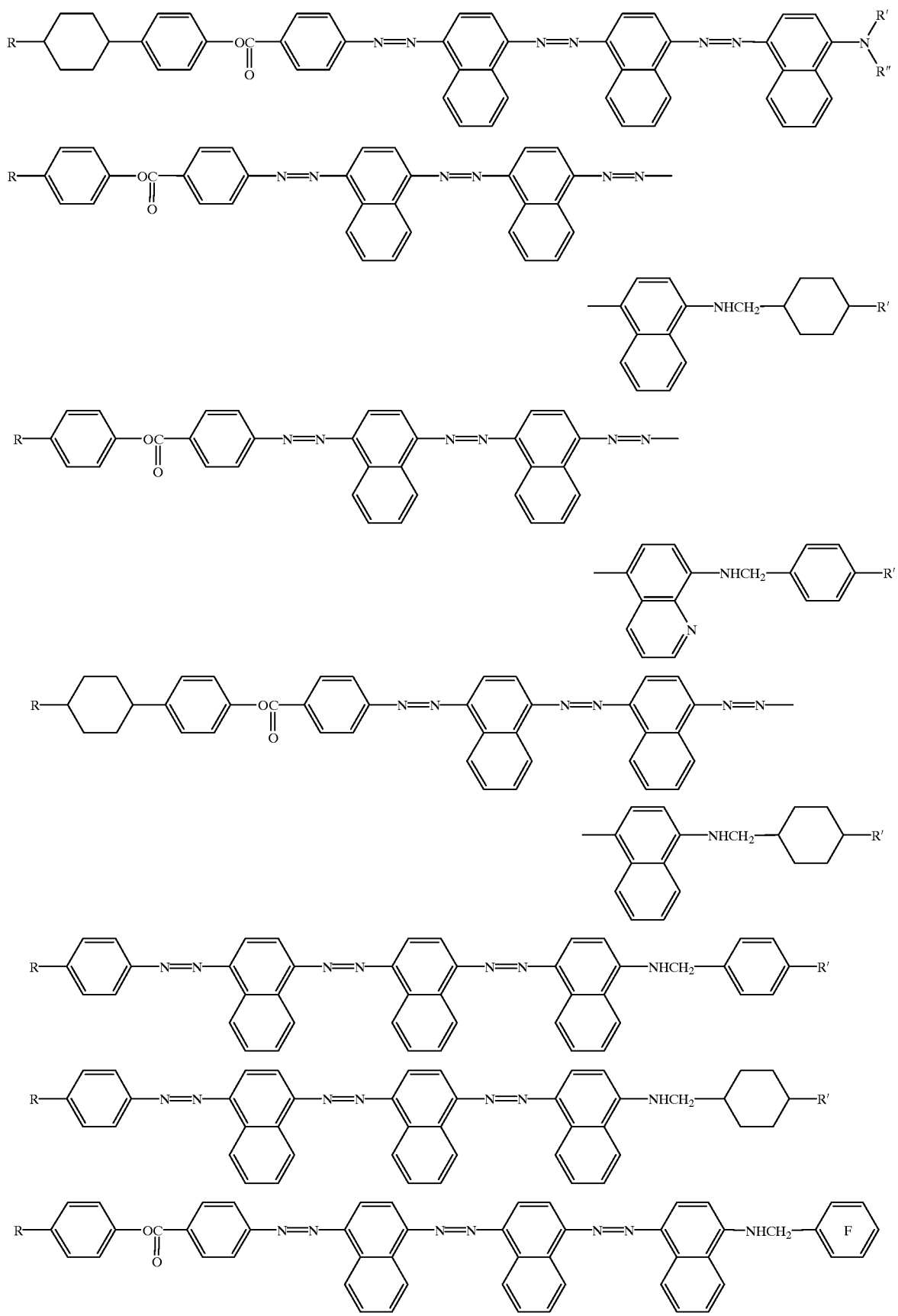

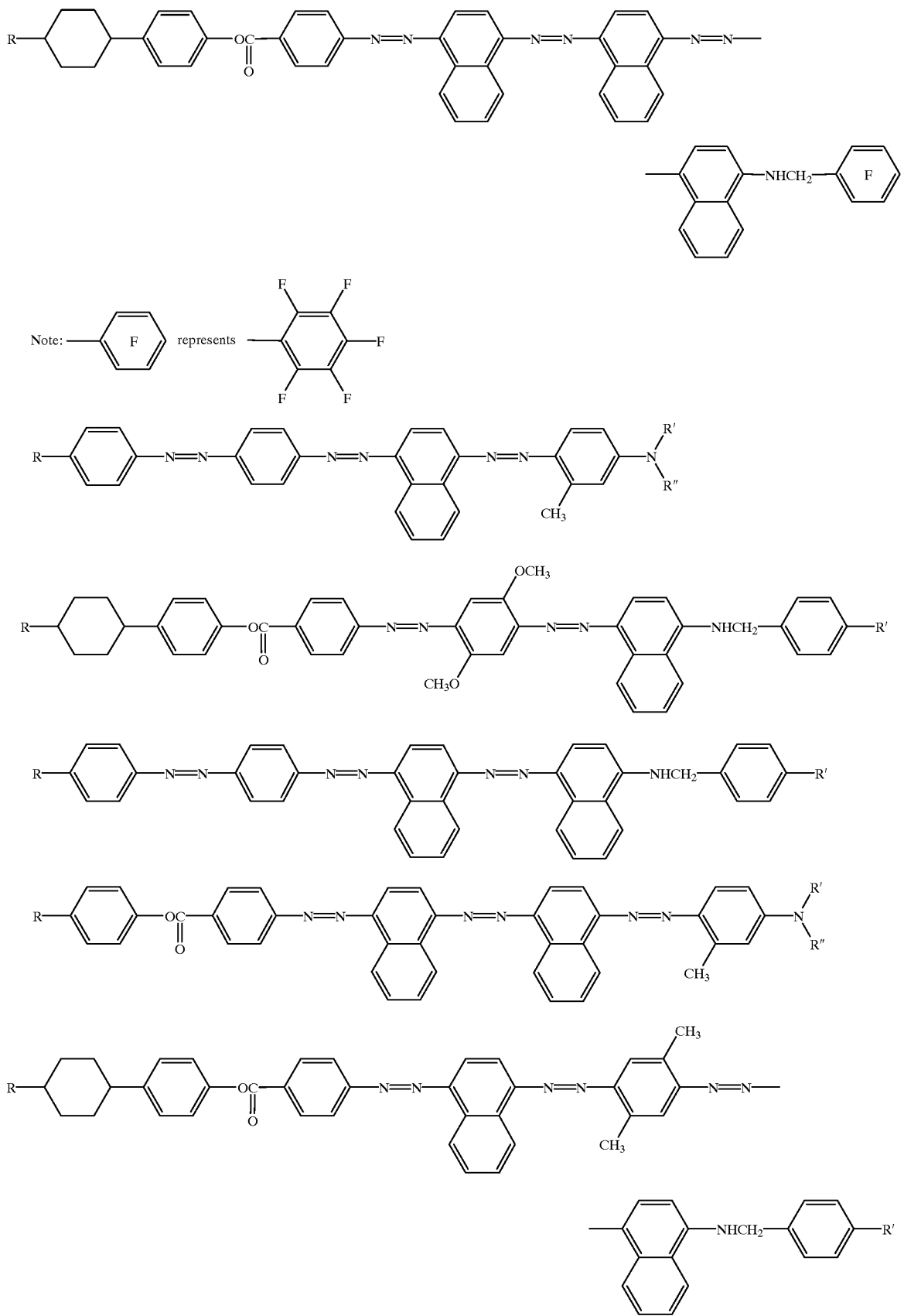

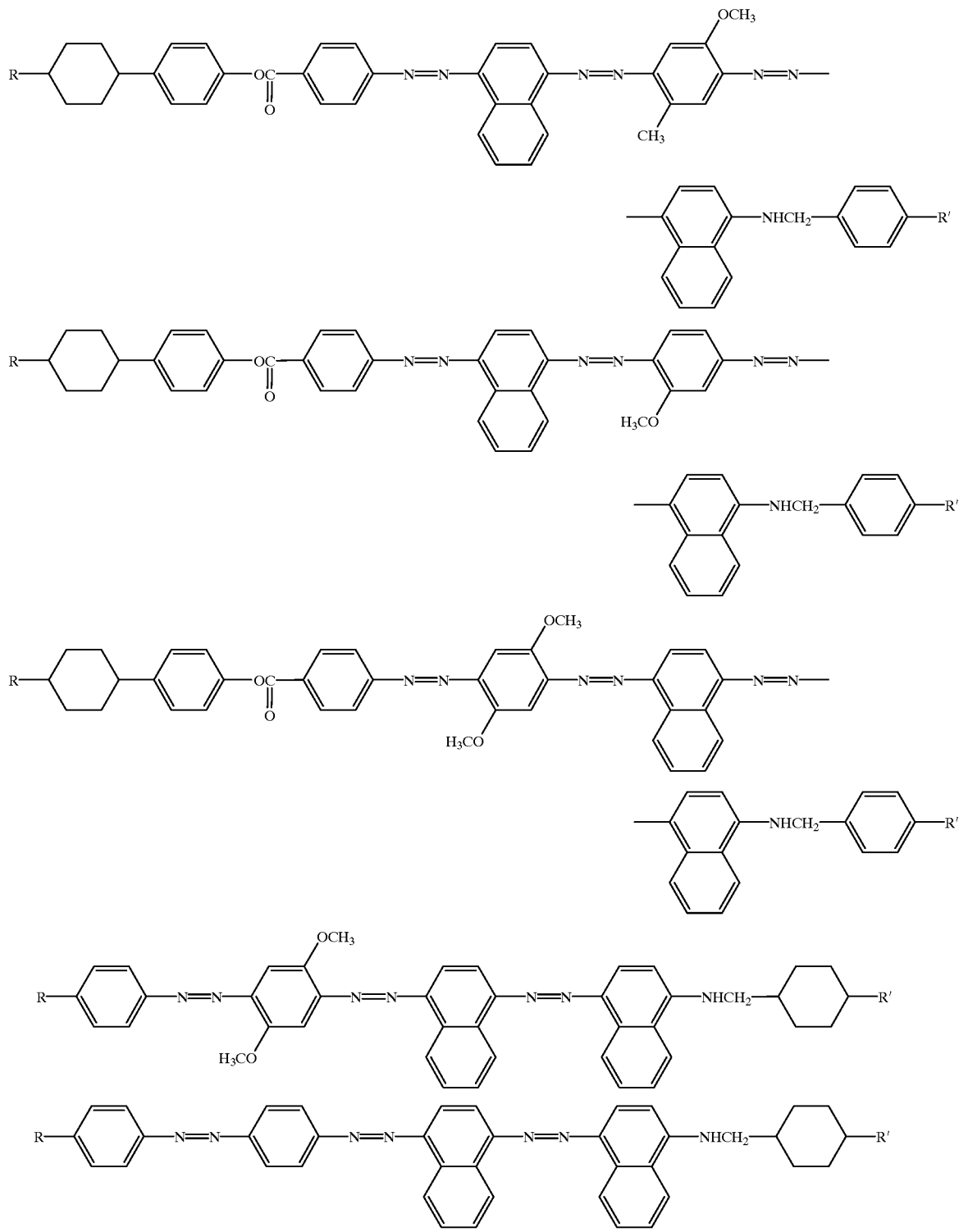
Specific examples of the dichroic dyes having the structure represented by general formula [II] include the following.

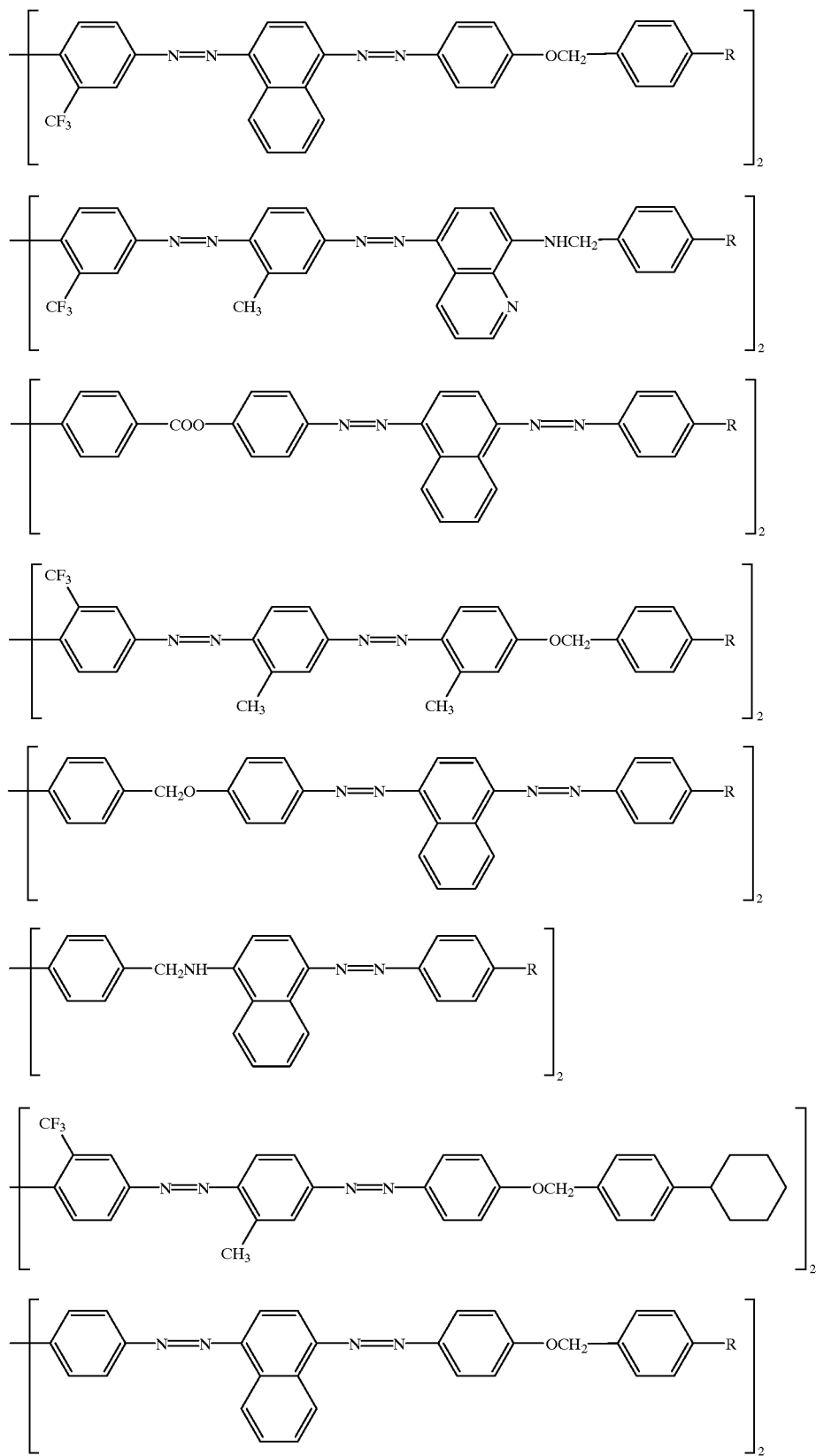

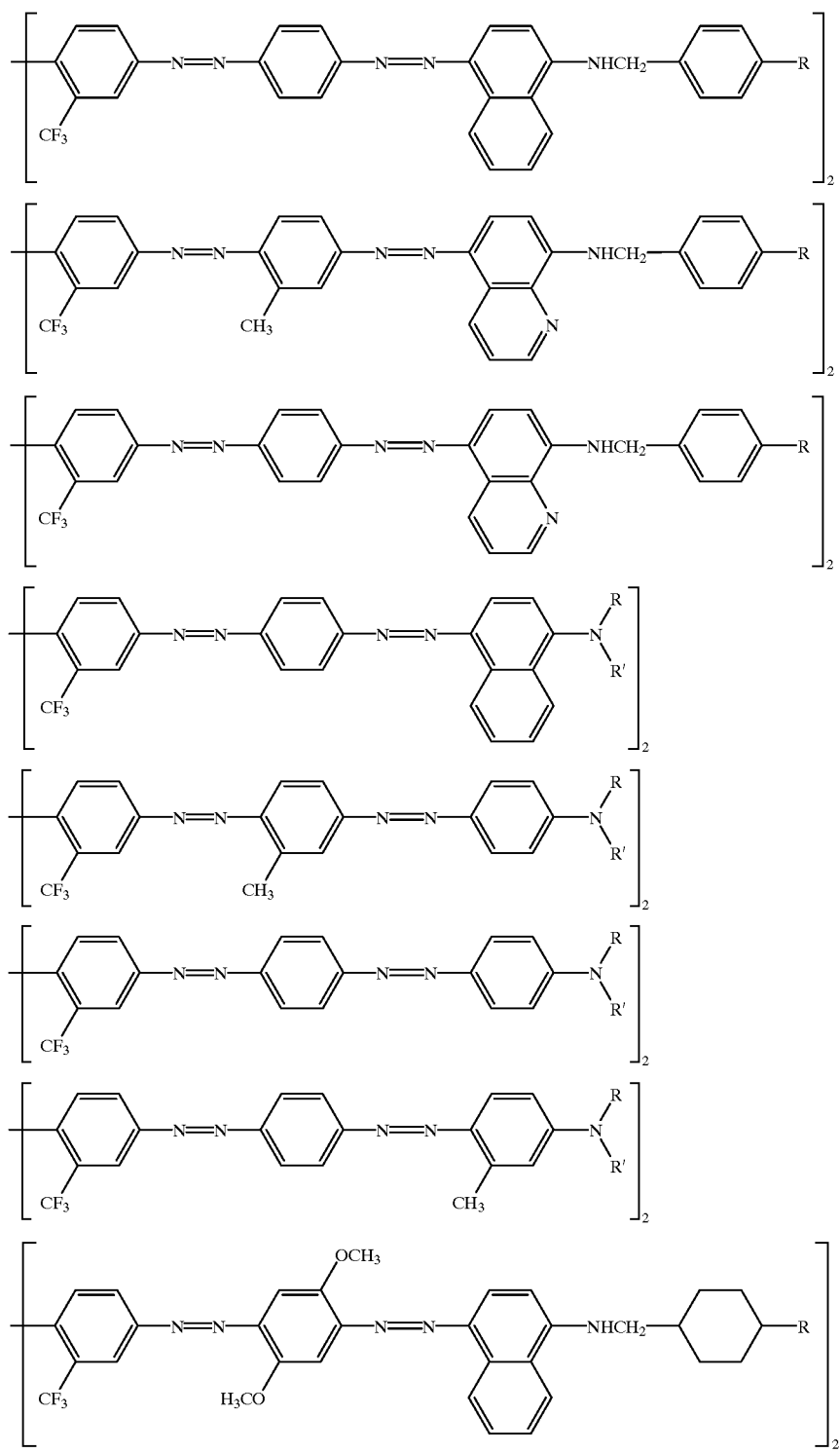
Furthermore, specific examples of the dichroic dyes having the structure represented by general formula [III] include the following.

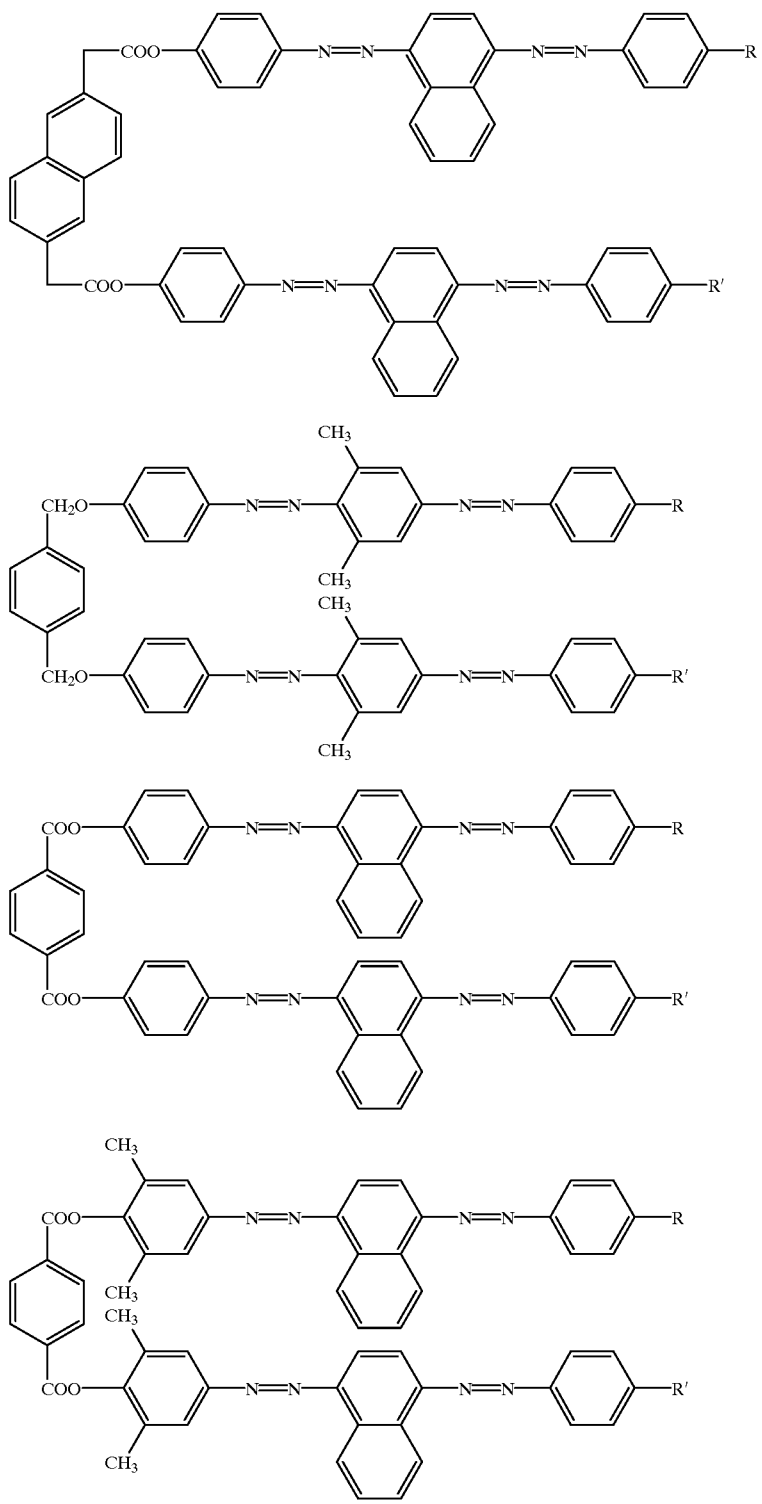

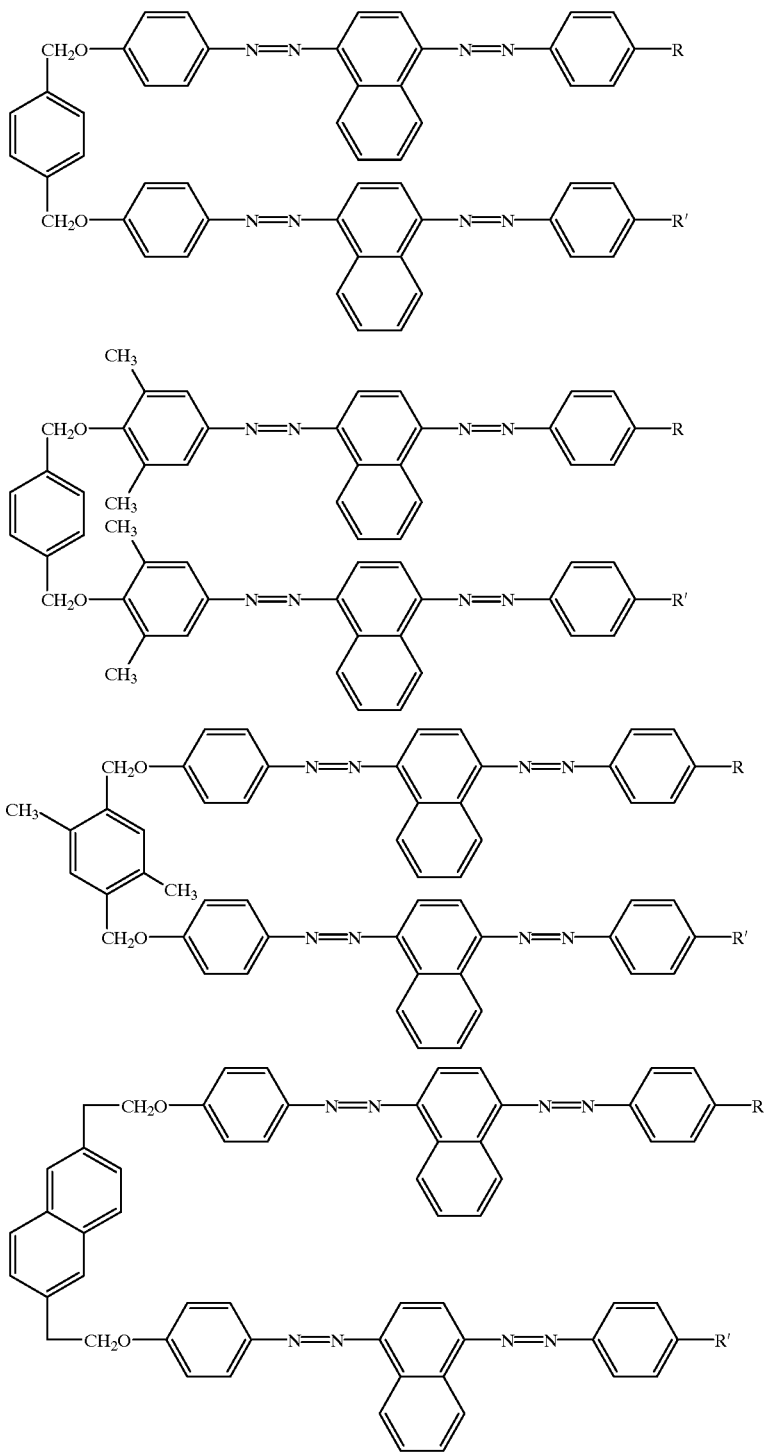

(In the above-enumerated examples of the dyes represented by general formulae [I] to [III], R, R', R", and R'" represent a hydrogen atom, a linear or branched alkyl group such as methyl, ethyl, propyl, butyl, pentyl, hexyl, octyl, nonyl, or dodecyl, a linear or branched alkoxyalkyl group such as methoxymethyl, butoxymethyl, ethoxyethyl, or butoxyethyl, a linear or branched alkoxy group such as methoxy, ethoxy, propoxy, butoxy, pentoxy, or octoxy, a halogen atom such as a fluorine, chlorine, or bromine atom, or an alkyl, alkoxyalkyl, or alkoxy group substituted with one or more halogen atoms.)

The guest-host liquid-crystal composition containing these dichroic azo dyes represented by [I], [II], or [III] has an order parameter (S value) as determined at its maximum absorption wavelength ($\lambda_{max}$) of 0.80 or higher, preferably 0.82 or higher.

In general formula [IV] given above, $Y^{11}$ and $Y^{12}$ preferably represent a hydrogen atom, a linear or branched alkyl group such as methyl, ethyl, propyl, butyl, pentyl, hexyl, octyl, nonyl, or dodecyl,

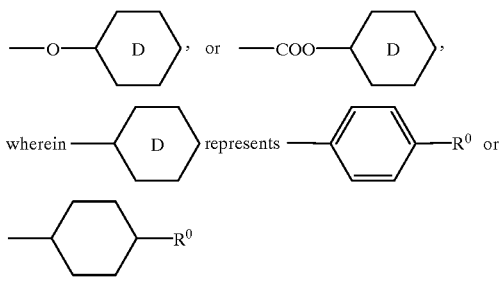

Preferred examples of $R^0$ include a hydrogen atom; linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentyl, and octoxy; halogen atoms such as fluorine, chlorine, and bromine atoms; the aforementioned alkyl, alkoxyalkyl, or alkoxy groups substituted with one or more of those halogen atoms; and a cyclohexyl or phenyl group which may be substituted with one or more of the aforementioned alkyl groups, alkoxyalkyl groups, halogen atoms, and alkoxy groups.

Specific examples of the dichroic dyes having the structure represented by general formula [IV] include the following.

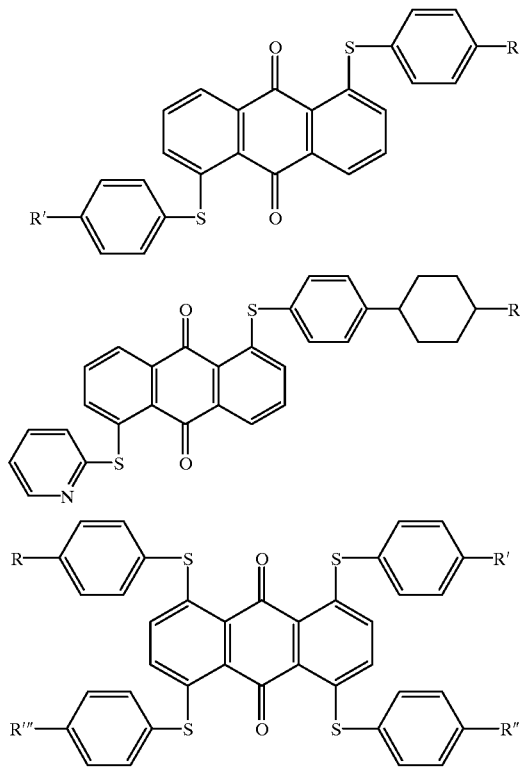

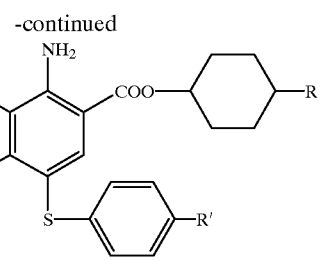

(In the above-enumerated examples of the dyes represented by general formula [IV], R and R' represent a hydrogen atom, a linear or branched alkyl group such as methyl, ethyl, propyl, butyl, pentyl, hexyl, octyl, nonyl, or dodecyl, a linear or branched alkoxyalkyl group such as methoxymethyl, butoxymethyl, ethoxyethyl, or butoxyethyl, a linear or branched alkoxy group such as methoxy, ethoxy, propoxy, butoxy, pentoxy, or octoxy, a halogen atom such as a fluorine, chlorine, or bromine atom, or an alkyl, alkoxyalkyl, or alkoxy group substituted with one or more halogen atoms.)

Preferred examples of $Y^{13}$ in general formula [V] given above are the same as those of $Y^{11}$ and $Y^{12}$ in general formula [IV]. Preferred examples of $R^0$ are also the same as those of the $R^0$ in general formula [IV].

Specific examples of the dichroic dyes having the structure represented by general formula [V] include the following.

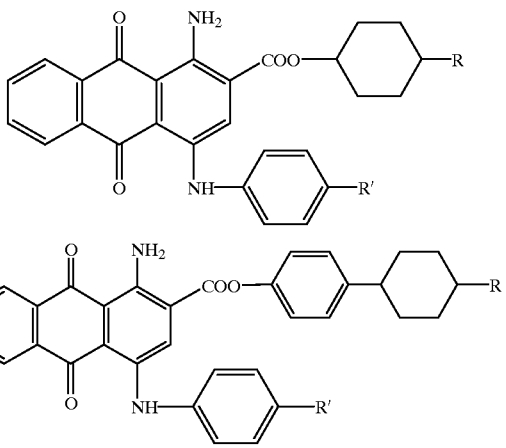

(In the above-enumerated examples of the dyes represented by general formula [V], R and R' represent a hydrogen atom, a linear or branched alkyl group such as methyl, ethyl, propyl, butyl, pentyl, hexyl, octyl, nonyl, or dodecyl, a linear or branched alkoxyalkyl group such as methoxymethyl, butoxymethyl, ethoxyethyl, or butoxyethyl, a linear or branched alkoxy group such as methoxy, ethoxy, propoxy, butoxy, pentoxy, or octoxy, a halogen atom such as a fluorine, chlorine, or bromine atom, or an alkyl, alkoxyalkyl, or alkoxy group substituted with one or more halogen atoms.)

The guest-host liquid-crystal composition containing these dichroic anthraquinone dyes represented by [IV] or [V] has an order parameter (S value) as determined at its maximum absorption wavelength ($\lambda_{max}$) of 0.76 or higher, preferably 0.78 or higher, especially preferably 0.80 or higher.

In the case of a guest-host liquid-crystal composition having a black hue, it is required to have a high order parameter (0.78 or higher) throughout the wide wavelength region of visible light. Hence, when the guest dye composition having a black hue comprises four dichroic dyes consisting of yellow, orange-red, violet, and blue dyes, at least three of the dichroic dyes preferably comprise dyes selected from azo dyes represented by general formulae [I] to [III] given above and from anthraquinone dyes represented by general formulae [IV] and [V] given above. When the guest dye composition having a black hue comprises three dichroic dyes consisting of yellow, red-violet, and blue dyes, at least two of the dichroic dyes preferably comprise dyes selected from azo dyes represented by general formulae [I] to [III] given above and from anthraquinone dyes represented by general formulae [IV] and [V] given above.

The guest-host liquid-crystal composition containing at least one dichroic dye selected from group A (yellow) described above, at least one dichroic dyes selected from group B (orange-red) described above, at least one dichroic dye selected from group C (violet) described above, and at least one dichroic dye selected from group D (blue) described above is especially preferred. This is because this guest-host liquid-crystal composition realizes a liquid-crystal composition having a high order parameter in a wide wavelength range, excellent solubility, and excellent low-temperature stability.

The above guest-host liquid-crystal composition having a black hue has an order parameter (S value) as determined in the wavelength range of from 470 to 560 nm of preferably 0.78 or higher, more preferably 0.80 or higher.

When a combination of dichroic dyes respectively selected from groups A to D described above is used in the present invention, it gives a liquid-crystal composition having excellent dichroism and a high order parameter.

The dyes in each group are known. The azo dyes represented by general formula [VI] given above are described, e.g., in JP-B-4-66913. (The term "JP-B" as used herein means an "examined Japanese patent publication".) The azo dyes represented by general formula [VII] are described, e.g., in JP-B-4-57716. The azo dyes represented by general formula [VIII] are described, e.g., in JP-A-63-301850. The anthraquinone dyes represented by general formula [IX] are described, e.g., in JP-B-2-34988. The anthraquinone dyes represented by general formula [X] are described, e.g., in JP-B-4-72875.

Preferred examples of $R^{11}$ in general formula [VI] given above include a hydrogen atom; linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentoxy, and octoxy; halogen atoms such as fluorine, chlorine, and bromine atoms; and a cyclohexyl or phenyl group which may be substituted with one or more of alkyl groups, alkoxy groups, halogen atoms, and alkoxyalkyl groups. More preferred examples of $R^{11}$ are a hydrogen atom, alkyl groups, alkoxyalkyl groups, and alkoxy groups.

Preferred examples of $R^{12}$ include a hydrogen atom; linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentoxy, and octoxy; and halogen atoms such as fluorine, chlorine, and bromine atoms.

Preferred examples of $R^{13}$ and $R^{14}$ in general formula [VII] given above include a hydrogen atom; linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentoxy, and octoxy; halogen atoms such as fluorine, chlorine, and bromine atoms; and a cyclohexyl or phenyl group which may be substituted with one or more of alkyl groups, alkoxy groups, halogen atoms, and alkoxyalkyl groups.

Preferred examples of $R^{15}$ in general formula [VIII] given above include a hydrogen atom; linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentoxy, and octoxy; halogen atoms such as fluorine, chlorine, and bromine atoms; and a cyclohexyl or phenyl group which may be substituted with one or more of alkyl groups, alkoxy groups, halogen atoms, and alkoxyalkyl groups.

Preferred examples of $R^{16}$ and $R^{17}$ include linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentoxy, and octoxy; halogen atoms such as fluorine, chlorine, and bromine atoms; and a benzyl or cyclohexylmethyl group which may be substituted with one or more of alkyl groups, alkoxy groups, halogen atoms, and alkoxyalkyl groups.

Preferred examples of $R^{18}$ and $R^{19}$ in general formula [IX] given above include a hydrogen atom; linear or branched alkyl groups such as methyl, ethyl, propyl, butyl, pentyl, hexyl, octyl, nonyl, and dodecyl; linear or branched alkoxyalkyl groups such as methoxymethyl, butoxymethyl, ethoxyethyl, and butoxyethyl; linear or branched alkoxy groups such as methoxy, ethoxy, propoxy, butoxy, pentoxy, and octoxy; halogen atoms such as fluorine, chlorine, and bromine atoms; and a cyclohexyl or phenyl group which may be substituted with one or more of these groups.

Preferred examples of each of $R^{20}$ and $R^{21}$ in general formula [X] given above include a hydrogen atom; linear or branched $C_{1-12}$ alkyl groups such as methyl, ethyl, propyl, butyl, pentyl, hexyl, octyl, nonyl, and dodecyl; $C_{2-8}$ alkoxyalkyl groups such as methoxymethyl, butoxymethyl, methoxypropyl, ethoxyethyl, and butoxyethyl; linear or branched $C_{1-12}$ alkoxy groups such as methoxy, ethoxy, propoxy, butoxy, pentoxy, and octoxy; halogen atoms such as fluorine, chlorine, and bromine atoms; and a cyclohexyl or phenyl group which may be substituted with one or more of these groups.

Most preferred among the dichroic dyes for use in the present invention, which are as described above, are those having the substituents shown below. Namely, most preferred examples of $R^{11}$ in general formula [VI] given above are linear or branched $C_1$–$C_{12}$ alkyl groups such as methyl, ethyl, propyl, butyl, pentyl, hexyl, octyl, nonyl, and dodecyl. Most preferred examples of $R^{12}$ are a hydrogen atom and $C_1$–$C_2$ alkoxy groups.

Most preferred examples of $R^{13}$ in general formula [VII] given above are linear or branched alkyl groups such as methyl, ethyl, propyl, butyl, pentyl, hexyl, octyl, nonyl, and dodecyl. Most preferred examples of $R^{14}$ are linear or branched alkoxy groups such as methoxy, ethoxy, propoxy, and butoxy.

Most preferred examples of $R^{15}$ in general formula [VIII] given above include linear or branched alkyl groups such as methyl, ethyl, propyl, butyl, pentyl, hexyl, octyl, nonyl, and dodecyl. Most preferred examples of $R^{16}$ and $R^{17}$ include linear or branched alkyl groups such as methyl, ethyl, propyl, butyl, pentyl, hexyl, octyl, nonyl, and dodecyl.

Most preferred examples of $R^{18}$ and $R^{19}$ in general formula [IX] given above include linear or branched alkyl groups such as methyl, ethyl, propyl, butyl, pentyl, hexyl, octyl, nonyl, and dodecyl.

Most preferred examples of $R^{20}$ and $R^{21}$ in general formula [X] given above include linear or branched $C_{1-12}$ alkyl groups such as methyl, ethyl, propyl, butyl, pentyl, hexyl, octyl, nonyl, and dodecyl.

Examples of dyes which can be used in the present invention are summarized in Table 1 below. Dichroic dyes selected from groups (A) to (D) are used in a proportion suitably selected so that a black hue is obtained. In general, the dichroic dyes are used in such a proportion that the contents of group (A) dyes, group (B) dyes, group (C) dyes, and group (D) dyes are 10 to 24% by weight, 4 to 9% by weight, 3 to 17% by weight, and 43 to 70% by weight, respectively, based on the total amount of all dyes.

The incorporation amount of the dichroic dyes is from 0.01 to 15% by weight, preferably from 0.1 to 15% by weight, more preferably from 0.5 to 15% by weight, based on the host liquid-crystal composition.

TABLE 1

VI

| General formula | | $R^{11}$ | $R^{12}$ |
|---|---|---|---|
| Dye | VI-1 | $C_3H_{17}(n)$ | $OC_5H_{11}(n)$ |
| | VI-2 | $C_3H_{17}(n)$ | $OC_5H_{11}(n)$ |
| | VI-3 | $C_3H_{17}(n)$ | H |
| | VI-4 | $C_4H_9(n)$ | $OC_4H_9(n)$ |

VII

| General formula | | $R^{13}$ | $R^{14}$ |
|---|---|---|---|
| Dye | VII-1 | $C_4H_9(n)$ | $OC_4H_9(n)$ |
| | VII-2 | $C_4H_9(n)$ | $OC_5H_{11}(n)$ |

VIII

| General formula | | $R^{15}$ | $R^{16}$ | $R^{17}$ |
|---|---|---|---|---|
| Dye | VIII-1 | $C_4H_9(n)$ | $C_2H_5(n)$ | $C_2H_5(n)$ |
| | VIII-2 | $C_3H_{17}(n)$ | $C_2H_5(n)$ | $C_2H_5(n)$ |

IX

TABLE 1-continued

| General formula | | $R^{18}$ | $R^{19}$ |
|---|---|---|---|
| Dye | IX-1 | $C_7H_{15}(n)$ | $CH_3(n)$ |
| | IX-2 | $C_3H_{17}(n)$ | $CH_3(n)$ |
| | IX-3 | $C_4H_9(n)$ | $CH_3(n)$ |

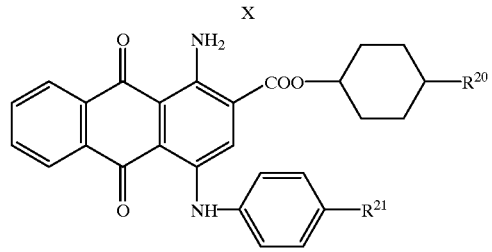

X

| General formula | | $R^{20}$ | $R^{21}$ |
|---|---|---|---|
| Dye | X-1 | $C_4H_9(n)$ | $C_4H_9(n)$ |
| | X-2 | $C_4H_9(n)$ | $C_3H_{17}(n)$ |
| | X-3 | $C_3H_{17}(n)$ | $C_4H_9(n)$ |
| | X-4 | $C_3H_{17}(n)$ | $C_3H_{17}(n)$ |

Various ultraviolet absorbers and antioxidants and chiral dopants may be added to the guest-host liquid-crystal composition of the present invention in an amount of about from 0.01 to 10% by weight. Examples of the chiral dopants include steroid liquid crystals such as cholesteric nonanoate and chiral nematic liquid crystals obtained by incorporating an optically active alkyl or alkoxy group or the like as a terminal substituent into the aforementioned or other liquid-crystal compounds. It should be noted that the liquid-crystal and other compounds added as chiral dopants are additives and are not included in the "host liquid-crystal composition" when the proportion of polycyclic compounds having three or more rings is calculated.

The guest-host liquid-crystal composition of the present invention can be easily obtained by mixing a liquid-crystal composition with dichroic dyes and various additives by means of an operation such as shaking to dissolve the ingredients.

The guest-host liquid-crystal composition thus prepared is sandwiched between a transparent electrode substrate having a color filter layer for three primary colors and an electrode substrate having a reflective layer. These electrode substrates have been treated so as to produce a phase transition type guest-host effect, as described, e.g., in Japan Society for the Promotion of Science, No. 142 Committee, "Liquid-Crystal Device Handbook", Nihon Kogyo Shimbun Co., Ltd. (1989), pp. 315–329 and pp. 367–370. The resulting structure is combined with an active operation system based on an active element such as the thin-film transistor MIM described, e.g., in Japan Society for the Promotion of Science, No. 142 Committee, "Liquid-Crystal Device Handbook", Nihon Kogyo Shimbun Co., Ltd. (1989), pp. 387–434. Thus, a liquid-crystal display element capable of displaying moving images in eight or more colors can be obtained.

The term "phase transition type" used herein means a system for phase conversions in which a chiral nematic liquid crystal comprising a cholesteric or nematic liquid crystal containing a chiral dopant and sandwiched between electrode substrates is caused to undergo phase conversions, from a cholesteric phase to a nematic phase, not having the helical structure of the cholesteric phase, and from the nematic to cholesteric phase, by applying a voltage thereto.

The term "color filter for three primary colors" means a color filter which is used for color displays based on the principle of additive color mixing, and in which each picture element has the three primary colors of red, green, and blue.

Since this phase transition type guest-host system utilizes light absorption by dye molecules contained in the guest-host liquid-crystal composition, it needs no polarizer and is capable of giving a bright image having high contrast. The phase transition type guest-host system is therefore especially suitable for use as a reflection type liquid-crystal display element.

A phase transition type reflective liquid-crystal display element employing an Nn liquid-crystal composition is illustrated as one example of such a liquid-crystal element by diagrammatic sectional views with respect to its voltage-applied state (FIG. 1) and its voltage-free state (FIG. 2).

As another example of the liquid-crystal display element according to the present invention, a Heilmeier mode transmission liquid-crystal display element employing an Np liquid-crystal composition is illustrated by diagrammatic sectional views with respect to its voltage-applied state (FIG. 3) and its voltage-free state (FIG. 4).

In the figures, 1 denotes incident light, 2 a polarizer, 3 a glass substrate, 4 a transparent electrode, 5 an alignment film, 6 a dichroic dye molecule, 7 a host liquid-crystal composition (liquid-crystal molecule), 8 transmitted light, 9 a reflective layer, and 10 reflected light.

EXAMPLES

The present invention will be explained below in more detail by reference to Examples. However, the present invention should not be construed as being limited to the following Examples, unless the invention departs from the spirit thereof.

Production of Guest-host Liquid-crystal Compositions and Liquid-crystal Elements employing the Same and Determination of Order Parameters:

The host liquid-crystal compositions whose components and compositions are shown in Tables 2 to 13 (each proportion is given in terms of mol %) were used. The dichroic-dye combinations shown in the following Examples 1 to 19 and Comparative Examples 1 to 8 each was added to those host liquid-crystal compositions and dissolved therein to prepare guest-host liquid-crystal compositions. The addition amount of dichroic dyes based on a host liquid-crystal composition was 0.2% by weight in the case of the azo and quinophthalone dyes, and was 0.4% by weight in the case of the anthraquinone dyes.

The guest-host liquid-crystal compositions thus prepared each was packed into a cell such as that shown in FIG. 3 or 4. The cell comprised two glass substrates 3 which each had a transparent electrode 4 and had undergone a treatment for homogeneous alignment comprising applying a polyimide resin to the surface to be in contact with the liquid-crystal composition (6 and 7), drying the coating, and then rubbing the same. These glass substrates 3 had been disposed so as to face each other (gap, 50 μm), with the surfaces which had undergone the alignment treatment (alignment films 5) facing inward. Each cell was then sealed. Thus, liquid-crystal display elements were fabricated.

When no voltage is applied to the cell, the liquid-crystal molecules of the liquid-crystal composition in the cell are homogeneously aligned in a certain direction parallel to the electrode surfaces, and the dye molecules are likewise aligned according to the host liquid-crystal composition.

The guest-host liquid-crystal elements thus fabricated were examined for absorption spectrum using polarized light parallel to the alignment direction of liquid-crystal molecules and polarized light perpendicular thereto to determine the dye absorbances A// and A⊥ for the respective polarized lights.

In determining the dye absorbances, corrections were made with respect to absorption by the host liquid-crystal composition and the glass substrates and to the reflection loss of the element. From the thus-determined dye absorbance values A// and A⊥ for the respective polarized lights, the order parameter (S value) was calculated using the following equation (1).

$$S=(A//-A\perp)/(2A\perp+A//) \quad (1)$$

The alkyl groups contained in the structural formulae given in Tables 2 to 14 and 16 to 22 are linear unless otherwise indicated.

Example 1

An element was fabricated by the method described above using fluorine-containing Np liquid-crystal composition LC-1 having a content of tri- and tetracyclic components of 92% by mole and a content of non-liquid-crystalline components of 8% by mole (Table 2, TNI=130.9° C.) and using some of the dichroic dyes shown in Table 14 (Dye-1 to Dye-5). The S values thereof were determined, and the results obtained are shown in Table 15.

Example 2

An element was fabricated in the same manner as in Example 1 using fluorine-containing Np liquid-crystal composition LC-2 having a content of tri- and tetracyclic components of 95% by mole and a content of non-liquid-crystalline components of 5% by mole (Table 3, TNI=110.0° C.) and using some of the dichroic dyes shown in Table 14 (Dye-1 to Dye-5). The S values thereof were determined, and the results obtained are shown in Table 15.

Comparative Example 1

An element was fabricated in the same manner as in Example 1 using fluorine-containing Np liquid-crystal composition LC-3 having a content of tri- and tetracyclic components of 70% by mole and a content of non-liquid-crystalline components of 30% by mole (Table 4, TNI=92.3° C.) and using some of the dichroic dyes shown in Table 14 (Dye-1 to Dye-5). The S values thereof were determined, and the results obtained are shown in Table 15.

This element had lower S values than those of Examples 1 and 2, in which the content of tri- and tetracyclic components was not lower than 75% by mole and that of non-liquid-crystalline components was not higher than 25% by mole.

Example 3

An element was fabricated in the same manner as in Example 1 using fluorine-containing Np liquid-crystal composition LC-4 having a content of tri- and tetracyclic components of 78% by mole and a content of non-liquid-crystalline and monotropic components of 22% by mole (Table 5, TNI=106.0° C.) and using some of the dichroic dyes shown in Table 14 (Dye-1 to Dye-5). The S values thereof were determined, and the results obtained are shown in Table 15.

Example 4

An element was fabricated in the same manner as in Example 1 using fluorine-containing Np liquid-crystal composition LC-5 having a content of tri- and tetracyclic components of 78% by mole and a content of non-liquid-crystalline components of 22% by mole (Table 6, TNI=91.1° C.) and using some of the dichroic dyes shown in Table 14 (Dye-1 to Dye-5). The S values thereof were determined, and the results obtained are shown in Table 15.

Comparative Example 2

An element was fabricated in the same manner as in Example 1 using fluorine-containing Np liquid-crystal composition LC-6 having a content of tri- and tetracyclic components of 68% by mole and a content of non-liquid-crystalline components of 32% by mole (Table 7, TNI=81.4° C.) and using some of the dichroic dyes shown in Table 14 (Dye-1 to Dye-5). The S values thereof were determined, and the results obtained are shown in Table 15.

This element had lower S values than those of Examples 3 and 4, in which the content of tri- and tetracyclic components was not lower than 75% by mole and that of non-liquid-crystalline components was not higher than 25% by mole.

Comparative Example 3

An element was fabricated in the same manner as in Example 1 using fluorine-containing Np liquid-crystal composition LC-7 having a content of tri- and tetracyclic components of 55% by mole and a content of non-liquid-crystalline and monotropic components of 45% by mole (Table 8, TNI=68.8° C.) and using some of the dichroic dyes shown in Table 14 (Dye-1 to Dye-5). The S values thereof were determined, and the results obtained are shown in Table 15.

This element had lower S values than that of Example 4, in which the content of tri- and tetracyclic components was 78% by mole and that of non-liquid-crystalline and monotropic components was 22% by mole.

Example 5

An element was fabricated in the same manner as in Example 1 using fluorine-containing Np liquid-crystal composition LC-8 having a content of tri- and tetracyclic components of 82% by mole and a content of non-liquid-crystalline components of 18% by mole (Table 9, TNI=105.8° C.) and using one of the dichroic dyes shown in Table 14 (Dye-1 to Dye-5). The S value thereof was determined, and the results obtained are shown in Table 15.

Example 6

An element was fabricated in the same manner as in Example 1 using fluorine-containing Np liquid-crystal composition LC-9 having a content of tri- and tetracyclic components of 86% by mole and a content of non-liquid-crystalline components of 14% by mole (Table 10, TNI=78.5° C.) and using one of the dichroic dyes shown in Table 14 (Dye-1 to Dye-5). The S value thereof was determined, and the results obtained are shown in Table 15.

Comparative Example 4

An element was fabricated in the same manner as in Example 1 using fluorine-containing Np liquid-crystal composition LC-6 having a content of tri- and tetracyclic components of 68% by mole and a content of non-liquid-crystalline components of 32% by mole (Table 7, TNI=81.4° C.) and using one of the dichroic dyes shown in Table 14 (Dye-1 to Dye-5). The S value thereof was determined, and the results obtained are shown in Table 15.

This element had a lower S value than those of Examples 5 and 6, in which the content of tri- and tetracyclic components was 75% by mole and that of non-liquid-crystalline components was not higher than 25% by. mole.

In particular, this comparative element employed a host liquid-crystal composition whose TNI was relatively close to and slightly higher than that of the host liquid-crystal composition used in Example 6. Despite this, the order parameter of the comparative element was lower than that in Example 6.

Compatative Example 5

An element was fabricated in the same manner as in Example 1 using fluorine-containing Np liquid-crystal composition LC-10 having a content of tri- and tetracyclic components of 61% by mole and a content of non-liquid-crystalline components of 39% by mole (Table 11, TNI=68.3° C.) and using one of the dichroic dyes shown in Table 14 (Dye-1 to Dye-5). The S value thereof was determined, and the results obtained are shown in Table 15.

This element had a lower S value than those of Examples 5 and 6, in which the content of tri- and tetracyclic components was not lower than 75% by mole and that of non-liquid-crystalline components was not higher than 25% by mole.

Example 7

An element was fabricated in the same manner as in Example 1 using Nn liquid-crystal composition LC-11 having a content of tri- and tetracyclic components of 75% by mole (Table 12, TNI=127.6° C.) and using some of the dichroic dyes shown in Table 14 (Dye-1 to Dye-5). The S values thereof were determined, and the results obtained are shown in Table 15.

Comparative Example 6

An element was fabricated in the same manner as in Example 1 using Nn liquid-crystal composition LC-12 having a content of tri- and tetracyclic components of 39% by mole (Table 13, TNI=100.0° C.) and using some of the dichroic dyes shown in Table 14 (Dye-1 to Dye-5). The S values thereof were determined, and the results obtained are shown in Table 15.

This element had a lower S value than that of Example 7, in which the content of tri- and tetracyclic components was 75% by mole.

Example 8

An element was fabricated in the same manner as in Example 1 using fluorine-containing Np liquid-crystal composition LC-1 having a content of tri- and tetracyclic components of 92% by mole and a content of non-liquid-crystalline components of 8% by mole (Table 2, TNI=130.9° C.) and using each of the azo dyes represented by general formula [I] which are shown in Table 16. The S values thereof were determined, and the results obtained are shown in Table 16.

Example 9

An element was fabricated in the same manner as in Example 1 using fluorine-containing Np liquid-crystal composition LC-1 having a content of tri- and tetracyclic components of 92% by mole and a content of non-liquid-crystalline components of 8% by mole (Table 2, TNI=130.9° C.) and using each of the azo dyes represented by general formula [II] which are shown in Table 17. The S values thereof were determined, and the results obtained are shown in Table 17.

Example 10

An element was fabricated in the same manner as in Example 1 using fluorine-containing Np liquid-crystal composition LC-1 having a content of tri- and tetracyclic components of 92% by mole and a content of non-liquid-crystalline components of 8% by mole (Table 2, TNI=130.9° C.) and using each of the azo dyes represented by general formula [III] which are shown in Table 18. The S values thereof were determined, and the results obtained are shown in Table 18.

Example 11

An element was fabricated in the same manner as in Example 1 using fluorine-containing Np liquid-crystal composition LC-1 having a content of tri- and tetracyclic components of 92% by mole and a content of non-liquid-crystalline components of 8% by mole (Table 2, TNI=130.9° C.) and using each of the anthraquinone dyes represented by general formula [IV] which are shown in Table 19. The S values thereof were determined, and the results obtained are shown in Table 19.

Example 12

An element was fabricated in the same manner as in Example 1 using fluorine-containing Np liquid-crystal composition LC-1 having a content of tri- and tetracyclic components of 92% by mole and a content of non-liquid-crystalline components of 8% by mole (Table 2, TNI=130.9° C.) and using each of the anthraquinone dyes represented by general formula [V] which are shown in Table 20. The S values thereof were determined, and the results obtained are shown in Table 20.

Comparative Example 7

An element was fabricated in the same manner as in Example 1 using fluorine-containing Np liquid-crystal composition LC-1 having a content of tri- and tetracyclic components of 92% by mole and a content of non-liquid-crystalline components of 8% by mole (Table 2, TNI=130.9° C.) and using each of the dichroic dyes not represented by any of general formulae [I] to [V] which are shown in Table 21. The S values thereof were determined, and the results obtained are shown in Table 21.

This element had lower S values than those employing dichroic dyes represented by general formulae [I] to [V].

Example 13 and Comparative Example 8

Elements were fabricated in the same manner as in Example 1 using two liquid-crystal compositions, i.e., fluorine-containing Np liquid-crystal composition LC-1 having a content of tri- and tetracyclic components of 92% by mole and a content of non-liquid-crystalline components of 8% by mole (Table 2, TNI=130.9° C.) and cyano Np liquid-crystal composition ZLI-1132 (manufactured by E. Merck), and using each of anthraquinone dye [IV]-1 represented by general formula [IV] and anthraquinone dye [V]-1 represented by general formula [V]. The S values thereof were determined, and the results obtained are shown in Table 22.

Example 14

The following dichroic dye (Dye 1) was dissolved in 100 g of a fluorine-containing Np liquid-crystal composition having a content of tri- and tetracyclic components of 92% by mole and a content of non-liquid-crystalline components of 8% by mole (LC-1) to prepare liquid-crystal composition I. Using this composition, an element was fabricated by the method described above. The S values thereof were determined, and the results obtained are shown in Table 23.

| Dye 1 | |
|---|---|
| [VI-1] | 0.38 g |
| [VI-2] | 0.36 g |
| [VII-1] | 0.20 g |
| [VIII-1] | 0.50 g |
| [X-1] | 1.00 g |
| [X-2] | 1.10 g |

This liquid-crystal composition I was allowed to stand at −20° C. for 500 hours. As a result, no abnormality including dye precipitation was observed.

Example 15

The same dichroic dye as in Example 1 above (Dye 1) was dissolved in 100 g of a fluorine-containing Np liquid-crystal composition having a content of tri- and tetracyclic components of 95% by mole and a content of non-liquid-crystalline components of 5% by mole (LC-2) to prepare liquid-crystal composition II. Using this composition, an element was fabricated in the same manner as in Example 14. The S values thereof were determined, and the results obtained are shown in Table 23.

This liquid-crystal composition II was allowed to stand at −20° C. for 500 hours. As a result, no abnormality including dye precipitation was observed.

Example 16

The following dichroic dye (Dye 2) was dissolved in 100 g of a fluorine-containing Np liquid-crystal composition having a content of tri- and tetracyclic components of 95% by mole and a content of non-liquid-crystalline components of 5% by mole (LC-2) to prepare liquid-crystal composition IV. Using this composition, an element was fabricated in the same manner as in Example 14. The S values thereof were determined, and the results obtained are shown in Table 23.

| Dye 2 | |
|---|---|
| [VI-1] | 0.62 g |
| [VI-2] | 0.59 g |
| [VII-1] | 0.36 g |
| [VIII-1] | 0.23 g |
| [IX-1] | 0.26 g |
| [IX-2] | 0.27 g |
| [X-1] | 1.16 g |
| [X-2] | 1.28 g |
| 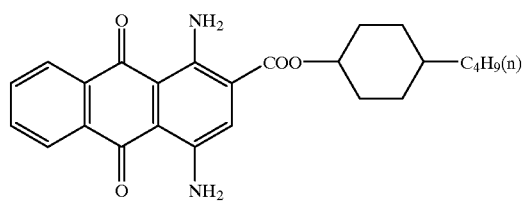 | 0.37 g |

-continued

Dye 2

[Structure: anthraquinone with 1,4-diamino groups and a 2-COO-cyclohexyl-C3H17(n) ester substituent]  0.41 g This liquid-crystal composition IV was allowed to stand at −20° C. for 500 hours. As a result, no abnormality including dye precipitation was observed.

Example 17

The dichroic dye having the following dye composition (Dye 3) was dissolved in 100 g of a fluorine-containing Np liquid-crystal composition having a content of tri- and tetracyclic components of 95% by mole and a content of non-liquid-crystalline components of 5% by mole (LC-2) to prepare liquid-crystal composition VI. Using this composition, an element was fabricated in the same manner as in Example 14. The S values thereof were determined, and the results obtained are shown in Table 23.

| Dye 3 | |
|---|---|
| [VI-1] | 0.61 g |
| [VI-2] | 0.58 g |
| [VII-1] | 0.32 g |
| [VIII-1] | 0.40 g |
| [VIII-2] | 0.43 g |
| [X-1] | 0.96 g |
| [X-2] | 1.06 g |
| [X-3] | 0.70 g |
| [X-4] | 0.76 g |

This liquid-crystal composition VI was allowed to stand at −20° C. for 500 hours. As a result, no abnormality including dye precipitation was observed.

Example 18

The same dichroic dye as in Example 14 above (Dye 1) was dissolved in 100 g of an Nn liquid-crystal composition having a content of tri- and tetracyclic components of 75% by mole (LC-11) to prepare liquid-crystal composition VII. Using this composition, an element was fabricated in the same manner as in Example 14. The S values thereof were determined, and the results obtained are shown in Table 24.

This liquid-crystal composition VII was allowed to stand at −20° C. for 500 hours. As a result, no abnormality including dye precipitation was observed.

Example 19

The same dichroic dye as in Example 14 above (Dye 1) was dissolved in 100 g of a liquid-crystal composition (LC-13, having a content of tri- and tetracyclic components of 78% by mole) obtained by mixing a fluorine-containing Np liquid-crystal composition (LC-1) with an Nn liquid-crystal composition (LC-12) in a weight ratio of 3/1. Thus, liquid-crystal composition IX was prepared. Using this composition, an element was fabricated in the same manner as in Example 13. The S values thereof were determined, and the results obtained are shown in Table 24.

This liquid-crystal composition IX was allowed to stand at −20° C. for 500 hours. As a result, no abnormality including dye precipitation was observed.

TABLE 2

Liquid-crystal Composition: LC-1    TNI = 130.9° C.

| Structure | | Liquid crystallinity | Proportion |
|---|---|---|---|
| Bicyclic components | $C_5H_{11}$—[cyclohexyl]—[phenyl]—F | non-liquid-crystalline | 1   8 |
| | $C_5H_{13}$—[cyclohexyl]—[phenyl]—F | non-liquid-crystalline | 3 |
| | $C_7H_{15}$—[cyclohexyl]—[phenyl]—F | non-liquid-crystalline | 4 |

TABLE 2-continued

Liquid-crystal Composition: LC-1    TNI = 130.9° C.

| Structure | | Liquid crystallinity | Proportion | |
|---|---|---|---|---|
| Tri- and tetracyclic components | $C_2H_5$—[Cy]—[Cy]—[Ph]—$OCF_3$ | enantiotropic | 8 | 92 |
| | $C_3H_7$—[Cy]—[Cy]—[Ph]—$OCF_3$ | " | 13 | |
| | $C_4H_9$—[Cy]—[Cy]—[Ph]—$OCF_3$ | " | 16 | |
| | $C_5H_{11}$—[Cy]—[Cy]—[Ph]—$OCF_3$ | " | 13 | |
| | $C_3H_7$—[Cy]—[Cy]—[Ph(F,F)] | " | 8 | |
| | $C_5H_{11}$—[Cy]—[Cy]—[Ph(F,F)] | " | 14 | |
| | $C_3H_7$—[Cy]—[Cy]—$CH_2CH_2$—[Ph]—$OCF_3$ | " | 6 | |
| | $C_5H_{11}$—[Cy]—[Cy]—$CH_2CH_2$—[Ph]—$OCF_3$ | " | 6 | |
| | $C_3H_7$—[Cy]—[Ph]—[Ph(F)]—[Cy]—$C_3H_7$ | " | 3 | |
| | $C_3H_{11}$—[Cy]—[Ph]—[Ph(F)]—[Cy]—$C_3H_7$ | " | 3 | |
| | $C_7H_{15}$—[Cy]—[Ph]—[Ph(F)]—[Cy]—$C_3H_7$ | " | 2 | |

TABLE 3
Liquid-crystal Composition: LC-2    TNI = 110.0° C.
| | Structure | Liquid crystallinity | Proportion | |
|---|---|---|---|---|
| Bicyclic components | 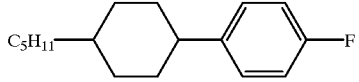 $C_5H_{11}$—◯—◯—F | non-liquid crystalline | 5 | 5 |
| Tri- and tetracyclic components | 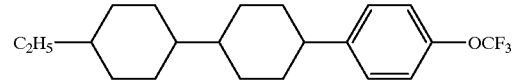 $C_2H_5$—◯—◯—◯—$OCF_3$ | enantiotropic | 7 | 95 |
| |  $C_3H_7$—◯—◯—◯—$CHF_2$ | " | 7 | |
| |  $C_3H_7$—◯—◯—◯—$OCF_3$ | " | 8 | |
| | 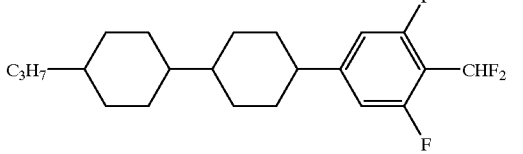 $C_3H_7$—◯—◯—◯(F,F)—$CHF_2$ | " | 9 | |
| |  $C_3H_{11}$—◯—◯—◯—$CHF_2$ | " | 7 | |
| | 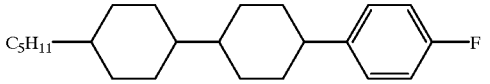 $C_5H_{11}$—◯—◯—◯—F | " | 12 | |
| |  $C_5H_{11}$—◯—◯—◯—$OCF_3$ | " | 16 | |
| | 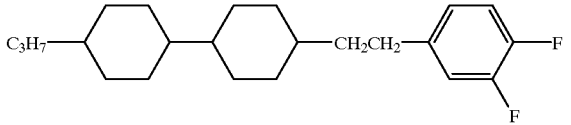 $C_3H_7$—◯—◯—$CH_2CH_2$—◯(F,F) | " | | |
| | 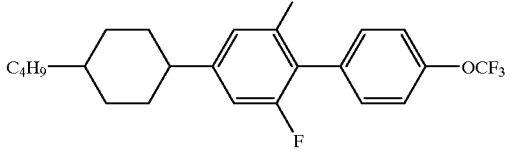 $C_4H_9$—◯—◯(F,F)—◯—$OCF_3$ | " | 4 | |

TABLE 3-continued

Liquid-crystal Composition: LC-2    TNI = 110.0° C.

| Structure | Liquid crystallinity | Proportion |
|---|---|---|
| $C_5H_{11}$—Cy—Cy—Ph(2-F,6-F)—$CHF_2$ | " | 11 |
| $C_5H_{11}$—Cy—Cy—$CH_2CH_2$—Ph(3-F,4-F) | " | 10 |
| $C_5H_{13}$—Cy—Ph(2-F,6-F)—Ph—$OCF_3$ | " | 4 |

TABLE 4

Liquid-crystal Composition: LC-3    TNI = 92.3° C.

| | Structure | Liquid crystallinity | Proportion | |
|---|---|---|---|---|
| Bicyclic components | $C_5H_{11}$—Cy—Ph—F | non-liquid-crystalline | 13 | 30 |
| | $C_5H_{13}$—Cy—Ph—F | non-liquid-crystalline | 10 | |
| | $C_7H_{15}$—Cy—Ph—F | non-liquid-crystalline | 7 | |
| Tri- and tetracyclic components | $C_2H_5$—Cy—Cy—Ph—$OCF_3$ | enantiotropic | 7 | 70 |
| | $C_3H_7$—Cy—Cy—Ph—$OCF_3$ | " | 11 | |
| | $C_4H_9$—Cy—Cy—Ph—$OCF_3$ | " | 12 | |
| | $C_5H_{11}$—Cy—Cy—Ph—$OCF_3$ | " | 10 | |

TABLE 4-continued

Liquid-crystal Composition: LC-3    TNI = 92.3° C.

| Structure | Liquid crystallinity | Proportion |
|---|---|---|
| $C_3H_7$—[Cy]—[Cy]—[Ph(F,F)] | " | 6 |
| $C_5H_{11}$—[Cy]—[Cy]—[Ph(F,F)] | " | 10 |
| $C_3H_7$—[Cy]—[Cy]—CH$_2$CH$_2$—[Ph]—OCF$_3$ | " | 4 |
| $C_5H_{11}$—[Cy]—[Cy]—CH$_2$CH$_2$—[Ph]—OCF$_3$ | " | 4 |
| $C_3H_7$—[Cy]—[Ph]—[Ph(F)]—[Cy]—$C_3H_7$ | " | 2 |
| $C_3H_{11}$—[Cy]—[Ph]—[Ph(F)]—[Cy]—$C_3H_7$ | " | 2 |
| $C_7H_{15}$—[Cy]—[Ph]—[Ph(F)]—[Cy]—$C_3H_7$ | " | 2 |

TABLE 5

Liquid-crystal Composition: LC-4    TNI = 106.0° C.

| | Structure | Liquid crystallinity | Proportion | |
|---|---|---|---|---|
| Bicyclic components | $C_5H_{13}$—[Cy]—[Ph]—F | non-liquid-crystalline | 2 | 22 |
| | $C_7H_{15}$—[Cy]—[Ph]—F | non-liquid-crystalline | 4 | |

TABLE 5-continued

Liquid-crystal Composition: LC-4    TNI = 106.0° C.

| Structure | Liquid crystallinity | Proportion | |
|---|---|---|---|
| C₃H₇—⟨cyclohexyl⟩—⟨phenyl⟩—C₂H₅ | enantiotropic | 8 | |
| C₃H₇—⟨cyclohexyl⟩—⟨phenyl⟩—OCH₃ | " | 5 | |
| C₃H₇—⟨cyclohexyl⟩—⟨phenyl⟩—OC₂H₅ | " | 3 | |
| Tri- and tetracyclic components C₂H₅—⟨cyclohexyl⟩—⟨cyclohexyl⟩—⟨phenyl⟩—OCF₃ | " | 6 | 78 |
| C₃H₇—⟨cyclohexyl⟩—⟨cyclohexyl⟩—⟨phenyl⟩—OCF₃ | " | 11 | |
| C₄H₉—⟨cyclohexyl⟩—⟨cyclohexyl⟩—⟨phenyl⟩—OCF₃ | " | 14 | |
| C₅H₁₁—⟨cyclohexyl⟩—⟨cyclohexyl⟩—⟨phenyl⟩—OCF₃ | " | 11 | |
| C₃H₇—⟨cyclohexyl⟩—⟨cyclohexyl⟩—⟨phenyl(F,F)⟩ | " | 7 | |
| C₅H₁₁—⟨cyclohexyl⟩—⟨cyclohexyl⟩—⟨phenyl(F,F)⟩ | " | 12 | |
| C₃H₇—⟨cyclohexyl⟩—⟨cyclohexyl⟩—CH₂CH₂—⟨phenyl⟩—OCF₃ | " | 5 | |
| C₅H₁₁—⟨cyclohexyl⟩—⟨cyclohexyl⟩—CH₂CH₂—⟨phenyl⟩—OCF₃ | " | 5 | |
| C₃H₇—⟨cyclohexyl⟩—⟨phenyl⟩—⟨phenyl(F)⟩—⟨cyclohexyl⟩—C₃H₇ | " | 3 | |

TABLE 5-continued

Liquid-crystal Composition: LC-4    TNI = 106.0° C.

| Structure | Liquid crystallinity | Proportion |
|---|---|---|
| 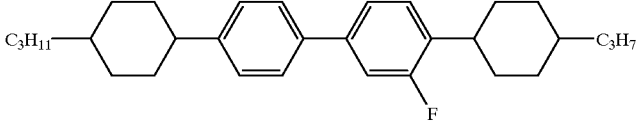 | " | 3 |
| 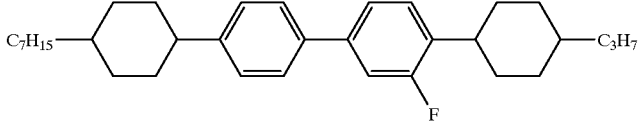 | " | 1 |

TABLE 6

Liquid-crystal Composition: LC-5    TNI = 91.1° C.

| | Structure | Liquid crystallinity | Proportion | |
|---|---|---|---|---|
| Bicyclic components | 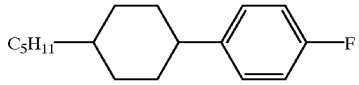 | non-liquid-crystalline | 1 | 22 |
| | 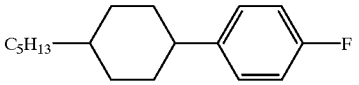 | non-liquid-crystalline | 2 | |
| | 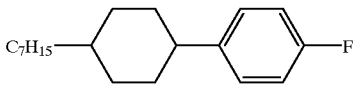 | non-liquid-crystalline | 3 | |
| | 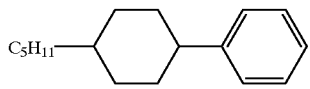 | non-liquid-crystalline | 16 | |
| Tri- and tetracyclic components |  | enantiotropic | 6 | 78 |
| |  | " | 11 | |
| |  | " | 13 | |
| | 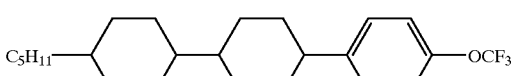 | " | 11 | |

TABLE 6-continued
Liquid-crystal Composition: LC-5    TNI = 91.1° C.
| Structure | Liquid crystallinity | Proportion |
|---|---|---|
| 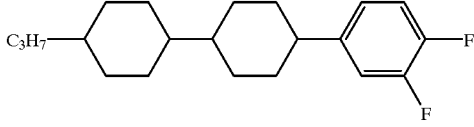 | " | 7 |
| 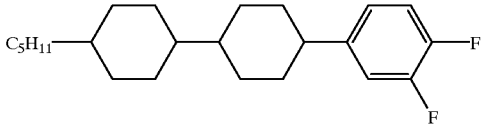 | " | 12 |
| 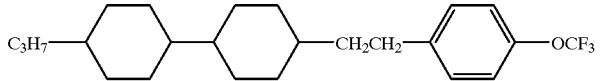 | " | 5 |
| 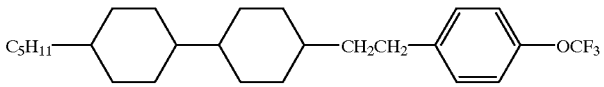 | " | 5 |
| 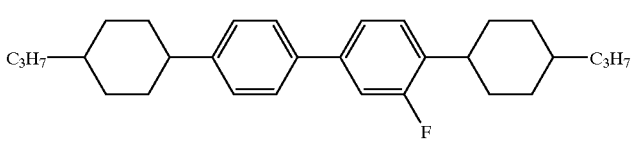 | " | 3 |
| 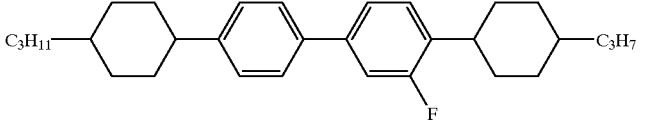 | " | 3 |
| 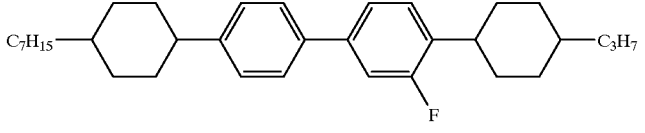 | " | 2 |
TABLE 7
Liquid-crystal Composition: LC-6    TNI = 81.4° C.
| | Structure | Liquid crystallinity | Proportion | |
|---|---|---|---|---|
| Bicyclic components | 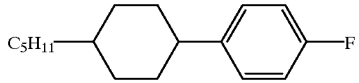 | non-liquid-crystalline | 15 | 32 |
| | 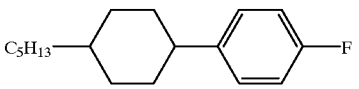 | non-liquid-crystalline | 10 | |
| | 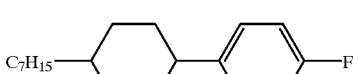 | non-liquid-crystalline | 7 | |

TABLE 7-continued
Liquid-crystal Composition: LC-6   TNI = 81.4° C.
| Structure | | Liquid crystallinity | Proportion |
|---|---|---|---|
| Tri- and tetracyclic components |  $C_2H_5$—◯—◯—◯—$OCF_3$ | enantiotropic | 7 |
| |  $C_3H_7$—◯—◯—◯—$OCF_3$ | " | 10 |
| |  $C_4H_9$—◯—◯—◯—$OCF_3$ | " | 12 |
| | 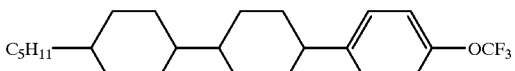 $C_5H_{11}$—◯—◯—◯—$OCF_3$ | " | 9 |
| | 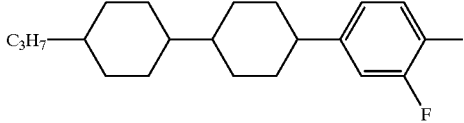 $C_3H_7$—◯—◯—◯(F,F) | " | 6 |
| | 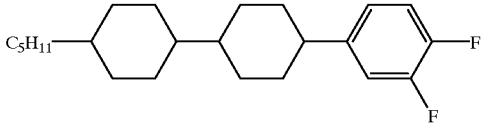 $C_5H_{11}$—◯—◯—◯(F,F) | " | 10 |
| | 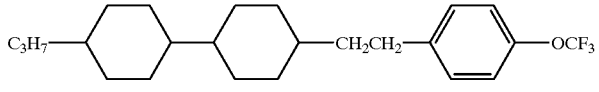 $C_3H_7$—◯—◯—$CH_2CH_2$—◯—$OCF_3$ | " | 4 |
| | 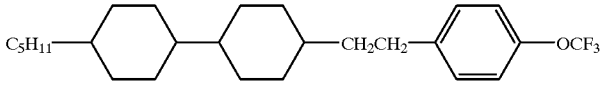 $C_5H_{11}$—◯—◯—$CH_2CH_2$—◯—$OCF_3$ | " | 4 |
| | 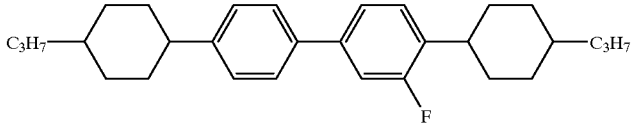 $C_3H_7$—◯—◯—◯(F)—◯—$C_3H_7$ | " | 2 |
| | 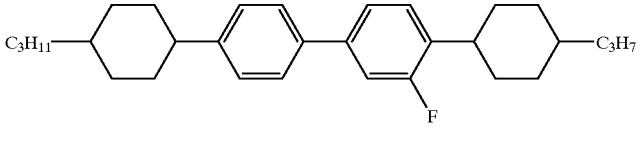 $C_3H_{11}$—◯—◯—◯(F)—◯—$C_3H_7$ | " | 2 |
| | 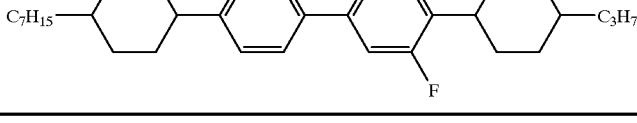 $C_7H_{15}$—◯—◯—◯(F)—◯—$C_3H_7$ | " | 2 |

TABLE 8
Liquid-crystal Composition: LC-7    TNI = 68.6° C.
| | Structure | Liquid crystallinity | Proportion | |
|---|---|---|---|---|
| Bicyclic components | 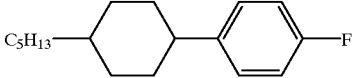 | non-liquid-crystalline | 1 | 45 |
| | 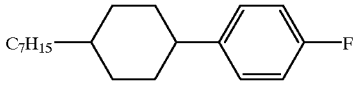 | non-liquid-crystalline | 2 | |
| | 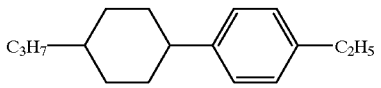 | enantiotropic | 20 | |
| | 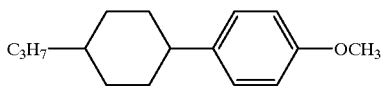 | " | 14 | |
| | 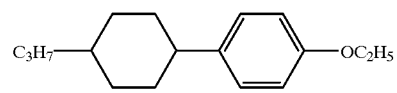 | " | 8 | |
| Tri- and tetracyclic components | 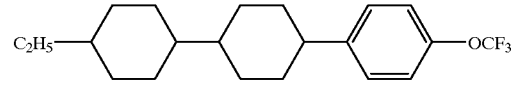 | " | 4 | 55 |
| |  | " | 8 | |
| | 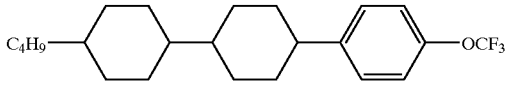 | " | 9 | |
| | 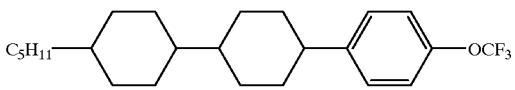 | " | 8 | |
| | 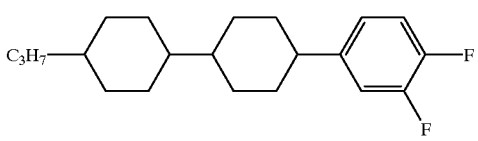 | " | 5 | |
| | 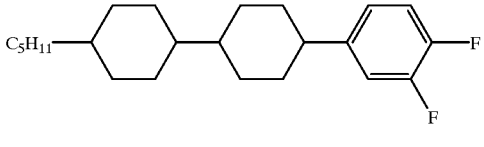 | " | 8 | |
| | 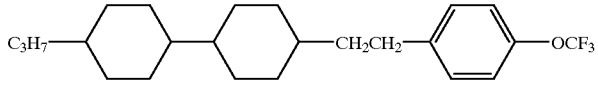 | " | 3 | |
| | 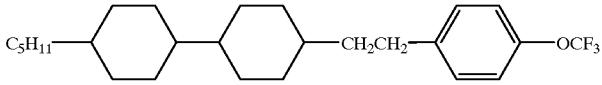 | " | 4 | |

TABLE 8-continued

Liquid-crystal Composition: LC-7    TNI = 68.6° C.

| Structure | Liquid crystallinity | Proportion |
|---|---|---|
| $C_3H_7$—⬡—⌬—⌬(F)—⬡—$C_3H_7$ | " | 2 |
| $C_3H_{11}$—⬡—⌬—⌬(F)—⬡—$C_3H_7$ | " | 2 |
| $C_7H_{15}$—⬡—⌬—⌬(F)—⬡—$C_3H_7$ | " | 2 |

TABLE 9

Liquid-crystal Composition: LC-8    TNI = 105.8 C.

| | Structure | Liquid crystallinity | Proportion | |
|---|---|---|---|---|
| Bicyclic components | $C_5H_{11}$—⬡—⌬—F | non-liquid-crystalline | 7 | 18 |
| | $C_5H_{13}$—⬡—⌬—F | non-liquid-crystalline | 6 | |
| | $C_7H_{15}$—⬡—⌬—F | non-liquid-crystalline | 5 | |
| Tri- and tetracyclic components | $C_2H_5$—⬡—⬡—⌬—$OCF_3$ | enantiotropic | 7 | 82 |
| | $C_3H_7$—⬡—⬡—⌬—$OCF_3$ | " | 12 | |
| | $C_4H_9$—⬡—⬡—⌬—$OCF_3$ | " | 14 | |
| | $C_5H_{11}$—⬡—⬡—⌬—$OCF_3$ | " | 12 | |

TABLE 9-continued

Liquid-crystal Composition: LC-8     TNI = 105.8 C.

| Structure | Liquid crystallinity | Proportion |
|---|---|---|
| $C_3H_7$—[Cy]—[Cy]—[Ph(3,4-F_2)] | " | 7 |
| $C_5H_{11}$—[Cy]—[Cy]—[Ph(3,4-F_2)] | " | 12 |
| $C_3H_7$—[Cy]—[Cy]—$CH_2CH_2$—[Ph]—$OCF_3$ | " | 5 |
| $C_5H_{11}$—[Cy]—[Cy]—$CH_2CH_2$—[Ph]—$OCF_3$ | " | 5 |
| $C_3H_7$—[Cy]—[Ph]—[Ph(3-F)]—[Cy]—$C_3H_7$ | " | 3 |
| $C_3H_{11}$—[Cy]—[Ph]—[Ph(3-F)]—[Cy]—$C_3H_7$ | " | 3 |
| $C_7H_{15}$—[Cy]—[Ph]—[Ph(3-F)]—[Cy]—$C_3H_7$ | " | 2 |

TABLE 10

Liquid-crystal Composition: LC-9     TNI = 78.5° C.

| | Structure | Liquid crystallinity | Proportion | |
|---|---|---|---|---|
| Bicyclic components | $C_5H_{11}$—[Cy]—[Ph]—I | non-liquid-crystalline | 10 | 14 |
| | $C_5H_{13}$—[Cy]—[Ph]—F | non-liquid-crystalline | 1 | |
| | $C_7H_{15}$—[Cy]—[Ph]—F | non-liquid-crystalline | 3 | |

TABLE 10-continued
Liquid-crystal Composition: LC-9    TNI = 78.5° C.
| Structure | | Liquid crystallinity | Proportion | |
|---|---|---|---|---|
| Tri- and tetracyclic components |  | enantiotropic | 7 | 86 |
| |  | " | 12 | |
| |  | " | 14 | |
| | 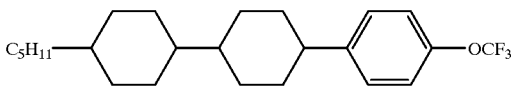 | " | 12 | |
| | 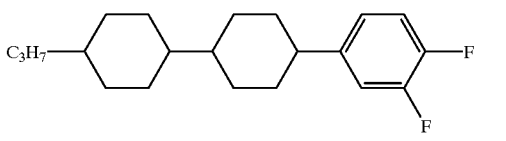 | " | 7 | |
| | 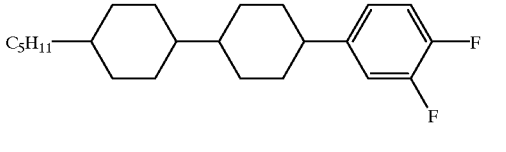 | " | 13 | |
| | 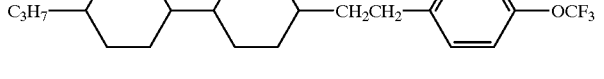 | " | 6 | |
| | 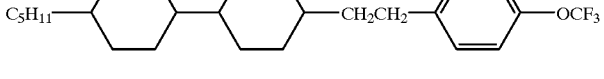 | " | 6 | |
| | 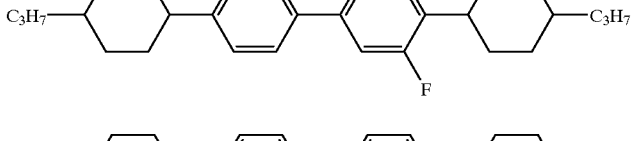 | " | 3 | |
| | 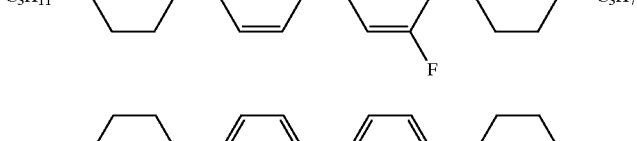 | " | 3 | |
| | 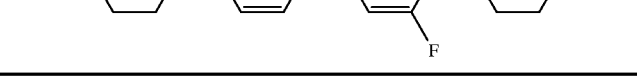 | " | 3 | |

TABLE 11

Liquid-crystal Composition: LC-10    TNI = 68.3° C.

| Structure | | Liquid crystallinity | Proportion | |
|---|---|---|---|---|
| Bicyclic components | 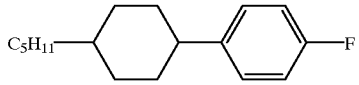 $C_5H_{11}$—◯—◯—F | non-liquid-crystalline | 18 | 39 |
| | 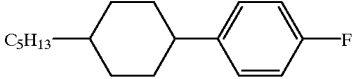 $C_5H_{13}$—◯—◯—F | non-liquid-crystalline | 13 | |
| | 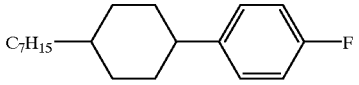 $C_7H_{15}$—◯—◯—F | non-liquid-crystalline | 8 | |
| Tri- and tetracyclic components |  $C_2H_5$—◯—◯—◯—$OCF_3$ | enantiotropic | 7 | 61 |
| | 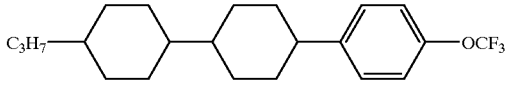 $C_3H_7$—◯—◯—◯—$OCF_3$ | " | 10 | |
| | 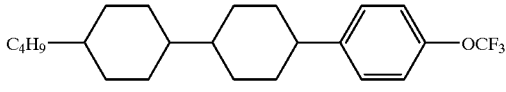 $C_4H_9$—◯—◯—◯—$OCF_3$ | " | 10 | |
| | 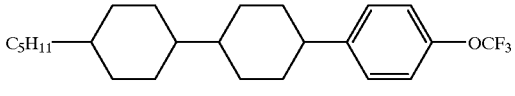 $C_5H_{11}$—◯—◯—◯—$OCF_3$ | " | 8 | |
| | 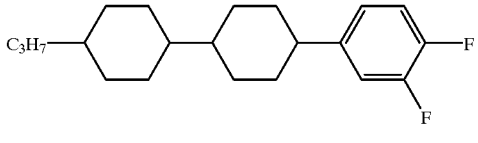 $C_3H_7$—◯—◯—◯(F)(F) | " | 5 | |
| | 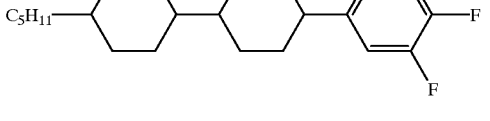 $C_5H_{11}$—◯—◯—◯(F)(F) | " | 8 | |
| | 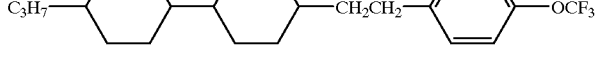 $C_3H_7$—◯—◯—$CH_2CH_2$—◯—$OCF_3$ | " | 4 | |
| | 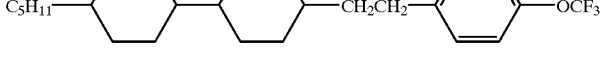 $C_5H_{11}$—◯—◯—$CH_2CH_2$—◯—$OCF_3$ | " | 4 | |
| |  $C_3H_7$—◯—◯—◯(F)—◯—$C_3H_7$ | " | 2 | |

TABLE 11-continued

Liquid-crystal Composition: LC-10    TNI = 68.3° C.

| Structure | Liquid crystallinity | Proportion |
|---|---|---|
| $C_5H_{11}$—⬡—⬢—⬢(F)—⬡—$C_3H_7$ | " | 2 |
| $C_7H_{15}$—⬡—⬢—⬢(F)—⬡—$C_3H_7$ | " | 1 |

TABLE 12

Liquid-crystal Composition: LC-11    TNI = 127.6° C.

| | Structure | Liquid crystallinity | Proportion | |
|---|---|---|---|---|
| Bicyclic components | $C_2H_5$—⬡—⬡—$OCH_3$ | enantiotropic | 4 | 25 |
| | $C_3H_7$—⬡—⬡—$OCH_3$ | " | 4 | |
| | $C_4H_9$—⬡—⬡(CN)—$C_7H_{15}$ | " | 8 | |
| | $C_5H_{11}$—⬡—⬡(CN)—$C_5H_{11}$ | " | 9 | |
| Tri- and tetracyclic components | $C_3H_7$—⬡—⬡—COO—⬡—$C_3H_7$ | " | 2 | 75 |
| | $C_4H_9$—⬡—⬡—COO—⬡—$C_3H_7$ | " | 2 | |
| | $C_3H_7$—⬡—⬡—COO—⬡—$C_5H_{13}$ | " | 2 | |
| | $C_4H_9$—⬡—⬡—COO—⬡—$C_5H_{11}$ | " | 2 | |

TABLE 12-continued
Liquid-crystal Composition: LC-11   TNI = 127.6° C.
| Structure | Liquid crystallinity | Proportion |
|---|---|---|
|  | " | 10 |
| 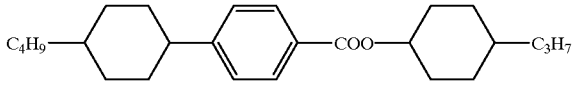 | " | 7 |
| 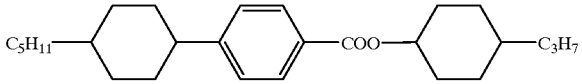 | " | 7 |
| 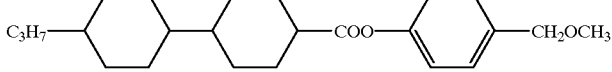 | " | 8 |
| 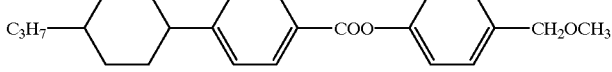 | " | 8 |
| 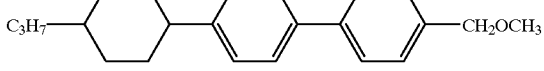 | " | 9 |
| 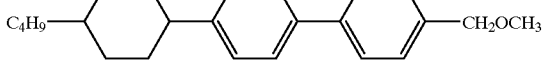 | " | 9 |
| 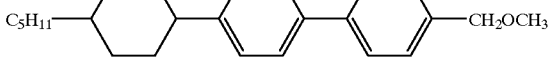 | " | 9 |
TABLE 13
Liquid-crystal Composition: LC-12   TNI = 100.0° C.
| | Structure | Liquid crystallinity | Proportion | |
|---|---|---|---|---|
| Bicyclic components | 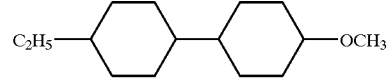 | enantiotropic | 10 | 61 |
| | 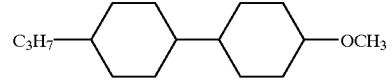 | " | 10 | |
| | 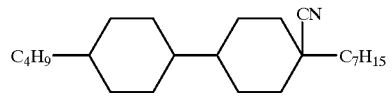 | " | 20 | |

TABLE 13-continued
Liquid-crystal Composition: LC-12    TNI = 100.0° C.
| Structure | | Liquid crystallinity | Proportion | |
|---|---|---|---|---|
| | $C_5H_{11}$—⬡—⬡($CN$)—$C_5H_{11}$ | " | 21 | |
| Tri- and tetracyclic components | $C_3H_7$—⬡—⬡—COO—⬡—$C_3H_7$ | " | 4 | 39 |
| | $C_4H_9$—⬡—⬡—COO—⬡—$C_3H_7$ | " | 4 | |
| | $C_3H_7$—⬡—⬡—COO—⬡—$C_5H_{13}$ | " | 4 | |
| | $C_4H_9$—⬡—⬡—COO—⬡—$C_5H_{11}$ | " | 4 | |
| | $C_5H_{11}$—⬡—⬡($CN$)—⬡—$C_5H_{11}$ | " | 23 | |
TABLE 14
Structural formula
Dye-1
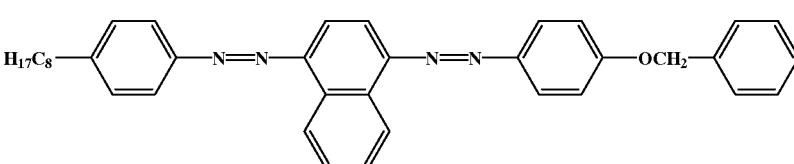
Dye-2
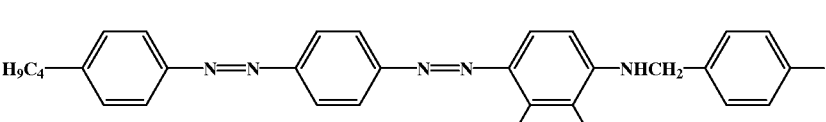
Dye-3
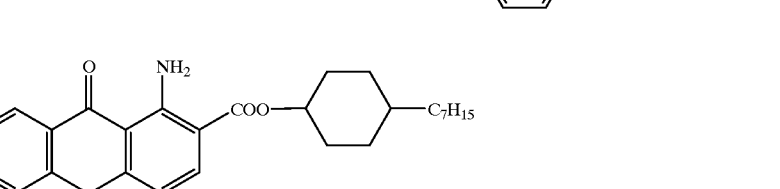

TABLE 14-continued
Structural formula
Dye-4
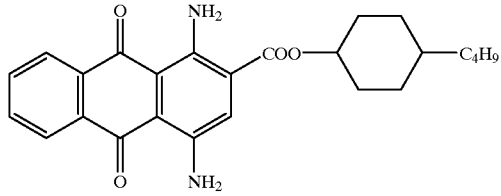
Dye-5
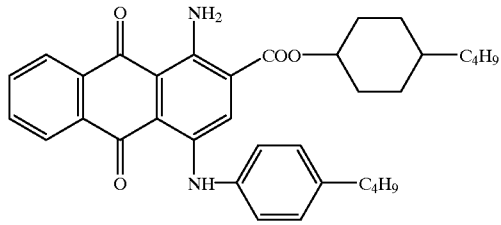
TABLE 15
| | Liquid-crystal composition | Proportion of components having three or more rings (%) | TNI (° C.) | Order parameter (S value) | | | | |
|---|---|---|---|---|---|---|---|---|
| | | | | Dye-1 | Dye-2 | Dye-3 | Dye-4 | Dye-5 |
| Ex. 1 | LC-1 | 92 | 130.9 | 0.81 | 0.82 | — | 0.78 | 0.80 |
| Ex. 2 | LC-2 | 95 | 110.0 | 0.81 | 0.80 | — | 0.77 | 0.78 |
| Comp. Ex. 1 | LC-3 | 70 | 92.3 | 0.78 | 0.79 | — | 0.73 | 0.75 |
| Ex. 3 | LC-4 | 78 | 106.0 | 0.81 | — | — | — | 0.76 |
| Ex. 4 | LC-5 | 78 | 91.1 | 0.80 | — | — | — | 0.76 |
| Comp. Ex. 2 | LC-6 | 68 | 81.4 | 0.76 | — | — | — | 0.72 |
| Comp. Ex. 3 | LC-7 | 55 | 68.6 | 0.73 | — | — | — | 0.69 |
| Ex. 5 | LC-8 | 82 | 105.8 | — | — | 0.78 | — | — |
| Ex. 6 | LC-9 | 86 | 78.5 | — | — | 0.77 | — | — |
| Comp. Ex. 4 | LC-6 | 68 | 81.4 | — | — | 0.74 | — | — |
| Comp. Ex. 5 | LC-10 | 61 | 68.3 | — | — | 0.72 | — | — |
| Ex. 7 | LC-11 | 75 | 127.6 | 0.82 | 0.82 | — | — | 0.77 |
| Comp. Ex. 6 | LC-12 | 39 | 100.0 | 0.78 | 0.77 | — | — | 0.70 |

TABLE 16

S values of Azo Dyes represented by General Formula [I]

| No. | Structural formula | S Value Host liquid crystal: LC-1 |
|---|---|---|
| [I]-1 | H$_{17}$C$_8$–(C$_6$H$_4$)–N=N–(naphthalene)–N=N–(C$_6$H$_4$)–OCH$_2$–(C$_6$H$_4$)–OC$_7$H$_{15}$ | 0.81 ($\lambda_{max}$: 458 nm) |
| [I]-2 | H$_9$C$_4$–(C$_6$H$_4$)–N=N–(C$_6$H$_4$)–N=N–(quinoline)–NHCH$_2$–(C$_6$H$_4$)–OC$_4$H$_9$ | 0.82 ($\lambda_{max}$: 512 nm) |
| [I]-3 | H$_9$C$_4$–(C$_6$H$_4$)–N=N–(C$_6$H$_4$)–N=N–(naphthalene)–(C$_6$H$_4$)–N(C$_2$H$_5$)$_2$ | 0.83 ($\lambda_{max}$: 559 nm) |
| [I]-4 | H$_{11}$C$_5$–(C$_6$H$_4$)–OOC–(C$_6$H$_4$)–N=N–(naphthalene)–N=N–(naphthalene)–NHCH$_2$–(cyclohexyl)–C$_5$H$_{11}$ | 0.83 ($\lambda_{max}$: 610 nm) |
| [I]-5 | H$_{17}$C$_8$–(C$_6$H$_4$)–N=N–(naphthalene)–N=N–(C$_6$H$_4$)–OCO–(C$_6$H$_4$)–(C$_6$H$_4$)–C$_3$H$_7$ | 0.83 ($\lambda_{max}$: 520 nm) |

TABLE 16-continued

S values of Azo Dyes represented by General Formula [I]

| No. | Structural formula (Dye) | S Value (Host liquid crystal: LC-1) |
|---|---|---|
| [I]-6 | H₁₁C₅—⟨C₆H₄⟩—COO—⟨C₆H₄⟩—N=N—⟨naphthyl⟩—N=N—⟨naphthyl⟩—N=N—⟨C₆H₄⟩—OCO—⟨C₆H₄⟩—⟨C₆H₄⟩—C₃H₇ | 0.86 (λ_max: 519 nm) |

TABLE 17

S values of Azo Dyes represented by General Formula [II]

| No. | Dye Structural formula | S Value Host liquid crystal: LC-1 |
|---|---|---|
| [II]-1 | [3-CF$_3$-phenyl–N=N–naphthylene–N=N–C$_6$H$_4$–OCH$_2$–C$_6$H$_4$–C$_5$H$_{11}$]$_2$ | 0.86 ($\lambda_{max}$: 470 nm) |
| [II]-2 | [3-CF$_3$-phenyl–N=N–(3-CH$_3$-phenyl)–N=N–(quinolinyl)–NHCH$_2$–C$_6$H$_4$–R]$_2$ R each is —C$_3$H$_7$, —C$_5$H$_{11}$, | 0.85 ($\lambda_{max}$: 534 nm) |

TABLE 18

S values of Azo Dyes represented by General Formula [III]

| No. | Dye Structural formula | S Value Host liquid crystal: LC-1 |
|---|---|---|
| [III]-1 | Naphthalene-2,6-diyl-bis[CH$_2$–COO–C$_6$H$_4$–N=N–naphthylene–N=N–C$_6$H$_4$–C$_4$H$_9$] and [CH$_2$–COO–C$_6$H$_4$–N=N–naphthylene–N=N–C$_6$H$_4$–C$_8$H$_{17}$] | 0.83 ($\lambda_{max}$: 450 nm) |

TABLE 18-continued

S values of Azo Dyes represented by General Formula [III]

| No. | Dye Structural formula | S Value Host liquid crystal: LC-1 |
|---|---|---|
| [III]-2 | (structure: bis-azo dye with two naphthalene-azo arms linked via a 1,4-bis(methylenecarboxylate)benzene core; one arm terminates in –C$_4$H$_9$, the other in –C$_8$H$_{17}$) | 0.82 ($\lambda_{max}$: 451 nm) |

TABLE 19

S values of Anthraquinone Dyes represented by General Formula [IV]

| No. | Dye Structural formula | S Value Host liquid crystal: LC-1 |
|---|---|---|
| [IV]-1 | (1-amino-2-(cyclohexyl-C$_7$H$_{15}$ carboxylate)-4-(4-methylphenylthio)anthraquinone) | 0.82 ($\lambda_{max}$: 589 nm) |
| [IV]-2 | (1-[4-(4-propylcyclohexyl)phenylthio]-5-(2-pyridylthio)anthraquinone) | 0.81 ($\lambda_{max}$: 461 nm) |
| [IV]-3 | (1,5-bis(4-R-phenylthio)anthraquinone); R, R' each is H or —C$_4$H$_9$(l) | 0.82 ($\lambda_{max}$: 463 nm) |

TABLE 19-continued

S values of Anthraquinone Dyes represented by General Formula [IV]

| | Dye | S Value |
|---|---|---|
| No. | Structural formula | Host liquid crystal: LC-1 |
| [IV]-4 | 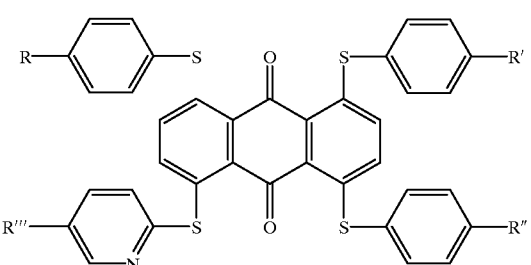 R, R', R", 'R" each is H or ——C$_4$H$_9$(t) | 0.80 ($\lambda_{max}$: 551 nm) |

TABLE 20

S values of Anthraquinone Dyes represented by General Formula [V]

| | Dye | S Value |
|---|---|---|
| No. | Structural formula | Host liquid crystal: LC-1 |
| [V]-1 | 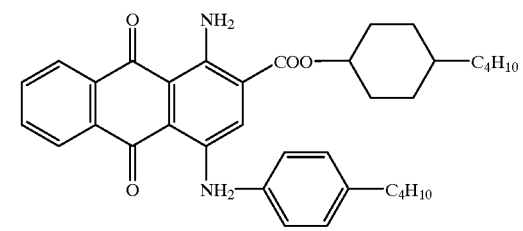 | 0.80 ($\lambda_{max}$: 664 nm) |
| [V]-2 | 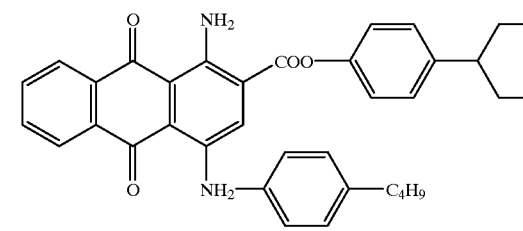 | 0.80 ($\lambda_{max}$: 670 nm) |

TABLE 21

S values of Dichroic Dyes not represented by General Formulae [I] to [V]

| | Dye | S Value | |
|---|---|---|---|
| No | Structural formula | Host liquid crystal: LC-1 | Host liquid crystal: LC-3 |
| CF-1 | 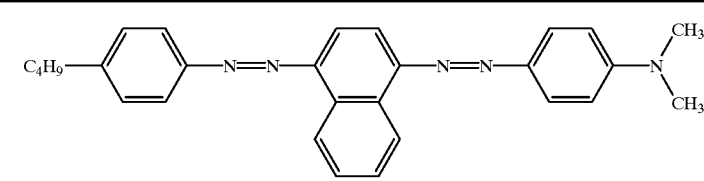 | 0.79 ($\lambda_{max}$: 517 nm) | 0.75 ($\lambda_{max}$: 517 nm) |

TABLE 21-continued

S values of Dichroic Dyes not represented by General Formulae [I] to [V]

| | Dye | S Value | |
|---|---|---|---|
| No | Structural formula | Host liquid crystal: LC-1 | Host liquid crystal: LC-3 |
| CF-2 | [structure: 3-hydroxyquinoline linked to indanedione with -COO-C6H4-C9H19(n)] | 0.72 ($\lambda_{max}$: 450 nm) | 0.66 ($\lambda_{max}$: 450 nm) |

TABLE 22

Comparison between LC-1 and Cyano Liquid Crystal (ZLI-1132) in S value of Anthraquinone Dye

| | Dye | S Value | |
|---|---|---|---|
| | | Example 13 | Comparative Example 8 |
| No. | Structural formula | Host liquid crystal: LC-1 | ZLI-1132 |
| [IV]-1 | [anthraquinone with NH2, COO-cyclohexyl-C7H15, S-C6H4-CH3] | 0.82 ($\lambda_{max}$: 589 nm) | 0.75 ($\lambda_{max}$: 589 nm) |
| [V]-1 | [anthraquinone with NH2, COO-cyclohexyl-C4H9, NH-C6H4-C4H9] | 0.80 ($\lambda_{max}$: 664 nm) | 0.74 ($\lambda_{max}$: 667 nm) |

TABLE 23

Np Liquid-crystal Compositions

| | | Liquid Crystal | | | |
|---|---|---|---|---|---|
| | | LC-1 | | LC-2 | |
| Dye | Dye 1 | Example 14 | | Example 15 | |
| | | Wavelength (nm) | S Value | Wavelength (nm) | S Value |
| | | 468 | 0.81 | 468 | 0.79 |
| | | 501 | 0.82 | 498 | 0.80 |
| | | 552 | 0.82 | 553 | 0.79 |
| | | 605 | 0.80 | 615 | 0.77 |

TABLE 23-continued

Np Liquid-crystal Compositions

| | Liquid Crystal | | | |
|---|---|---|---|---|
| | LC-1 | | LC-2 | |
| Dye 2 | | | Example 16 | |
| | Wavelength (nm) | S Value | Wavelength (nm) | S Value |
| | | | 465 | 0.78 |
| | | | 495 | 0.79 |
| | | | 543 | 0.79 |
| | | | 605 | 0.77 |

TABLE 23-continued

Np Liquid-crystal Compositions

| | Liquid Crystal | |
|---|---|---|
| | LC-1 | LC-2 |
| Dye 3 | | Example 17 |
| | | Wavelength (nm) S value |
| | | 466 0.78 |
| | | 503 0.78 |
| | | 572 0.77 |
| | | 605 0.76 |

TABLE 24

Nn Liquid-crystal Composition and Nn/Np Liquid-crystal Composition

| | | Liquid Crystal | | |
|---|---|---|---|---|
| | | LC-11 Example 18 | | LC-13 Example 19 |
| Dye | Dye 1 | Wavelength (nm) | S Value | Wavelength (nm) S Value |
| | | 467 | 0.82 | 466 0.79 |
| | | 502 | 0.82 | 501 0.80 |
| | | 559 | 0.82 | 559 0.79 |
| | | 606 | 0.80 | 601 0.79 |

EFFECTS OF THE INVENTION

As described above, the present invention has effects that a liquid-crystal display element employing a guest-host composition having a high order parameter can be provided and a high-contrast display can be obtained.

Figure 1:
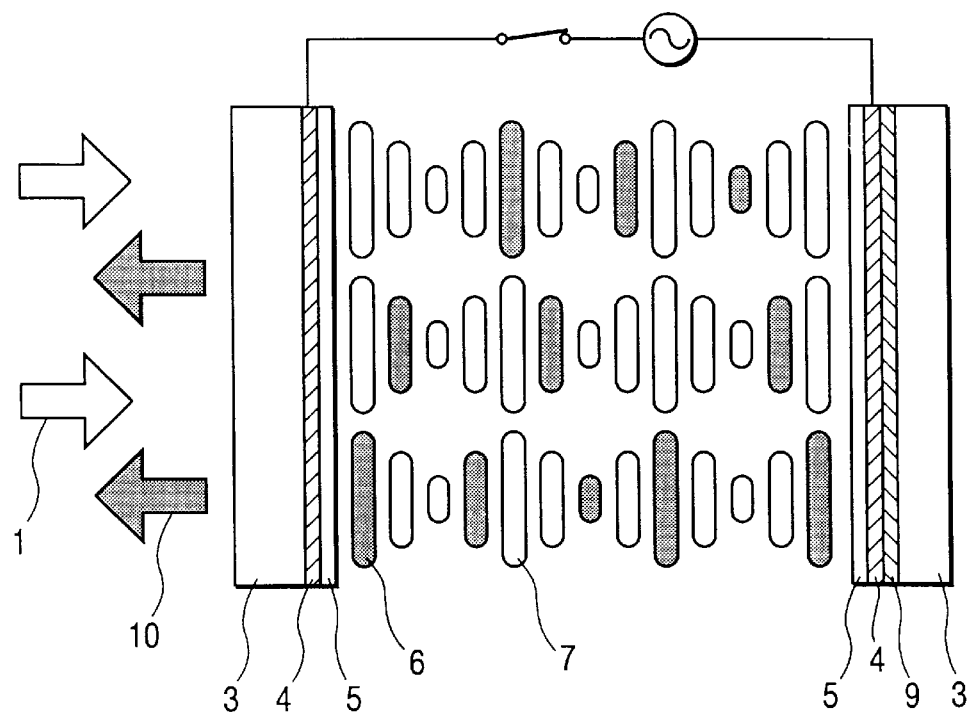
FIG. 1 is a diagrammatic view of a phase transition mode reflective liquid-crystal display element, as an example of the liquid-crystal display element according to the present invention, which employs an Nn liquid-crystal composition and is in a voltage-applied state.
Figure 2:
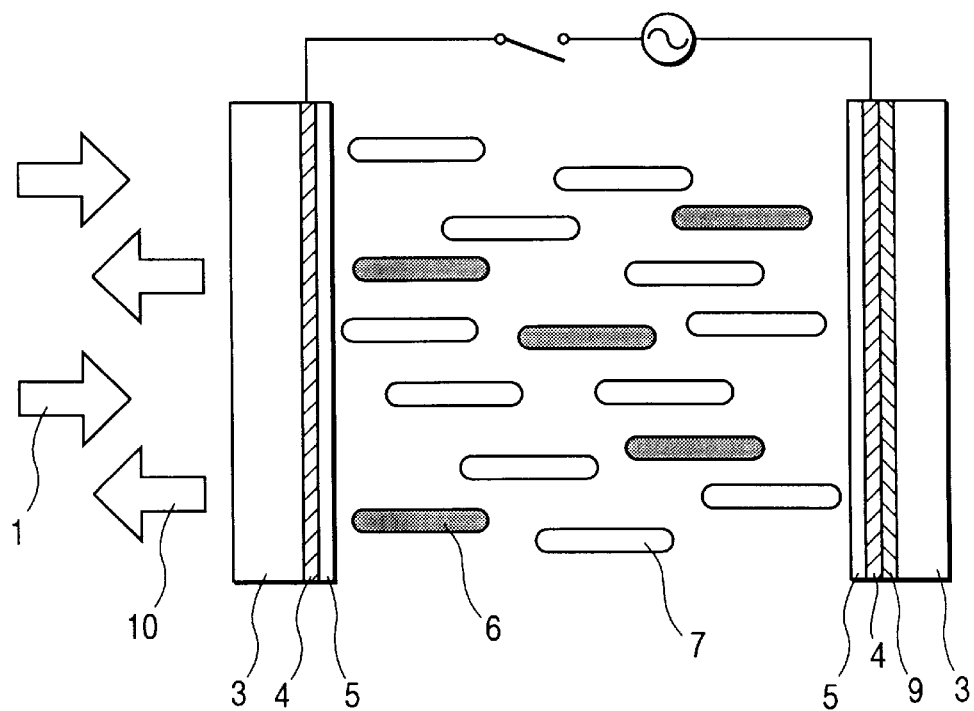
FIG. 2 is a diagrammatic view of the phase transition mode reflective liquid-crystal display element, as an example of the liquid-crystal display element according to the present invention, which employs an Nn liquid-crystal composition and is in a voltage-free state.
Figure 3:
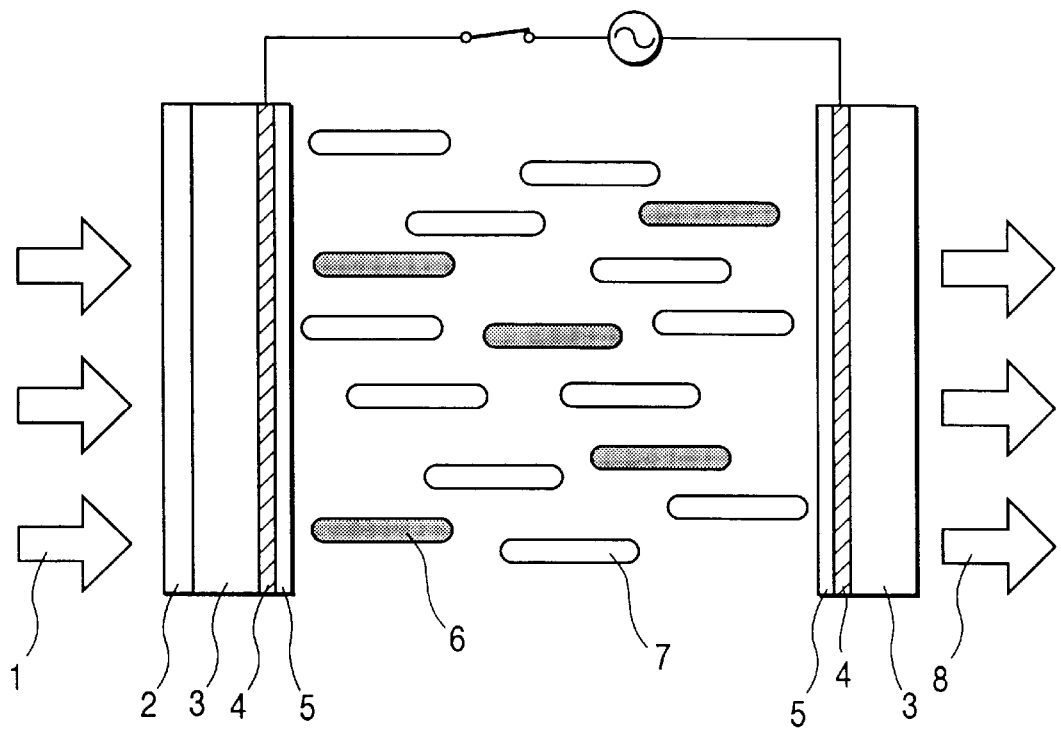
FIG. 3 is a diagrammatic view of a heilmeier mode transmission liquid-crystal display element, as an example of the liquid-crystal display element according to the present invention, which employs an Np liquid-crystal composition and is in a voltage-applied state.
Figure 4:
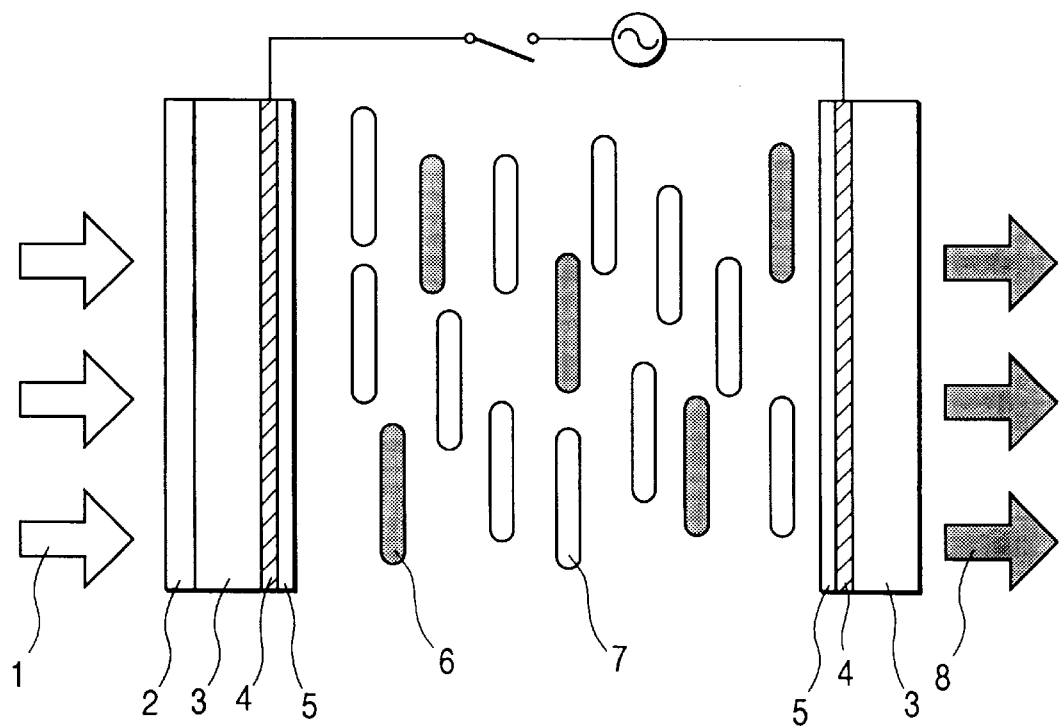
FIG. 4 is a diagrammatic view of the heilmeier mode transmission liquid-crystal display element, as an example of the liquid-crystal display element according to the present invention, which employs an Np liquid-crystal composition and is in a voltage-free state.

1 incident light
2 polarizer
3 glass substrate
4 transparent electrode
5 alignment film
6 dichroic dye molecule
7 host liquid-crystal composition (liquid-crystal molecule)
8 transmitted light
9 reflective layer
10 reflected light

We claim:

1. A guest-host liquid-crystal composition comprising a host liquid-crystal composition containing a dichroic dye, wherein:

the host liquid-crystal composition comprises as the main component plural different polycyclic compounds having three or more rings and having no cyano group in the direction of the molecular axis, the proportion of the polycyclic compound component having three or more rings in the host liquid-crystal being at least 75% by mole based on the total moles of the host liquid-crystal composition; and the guest-host liquid-crystal composition has an order parameter (S value) of at least 0.76, wherein the polycyclic compounds having three or more rings and having no cyano group in the direction of the molecular axis are fluorine-containing liquid-crystal compounds are selected from compounds represented by the following formulae:

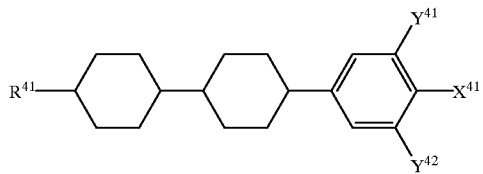

(1)

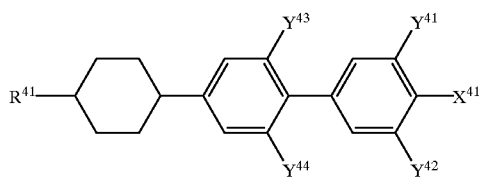

(2)

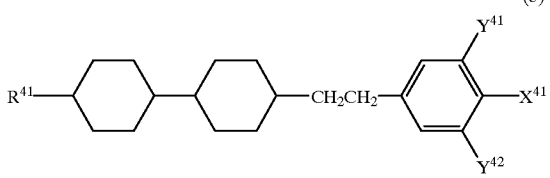

(3)

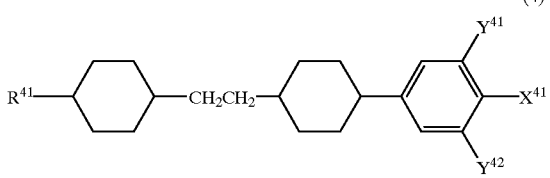

(4)

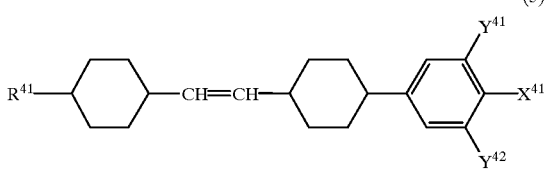

(5)

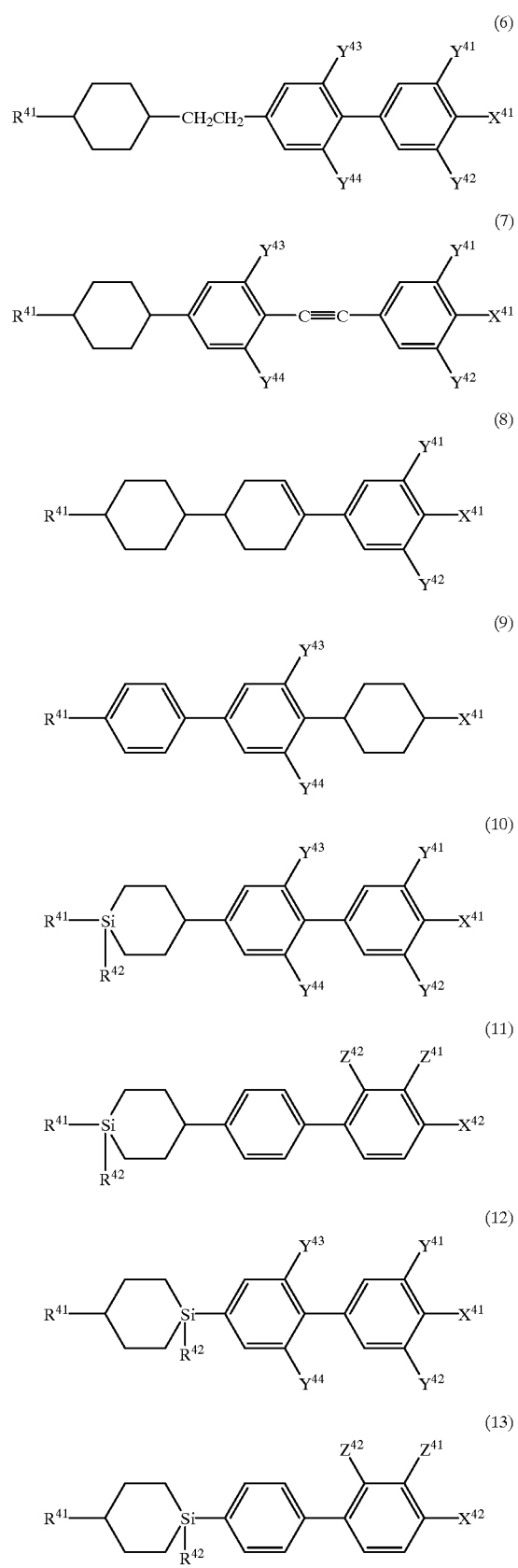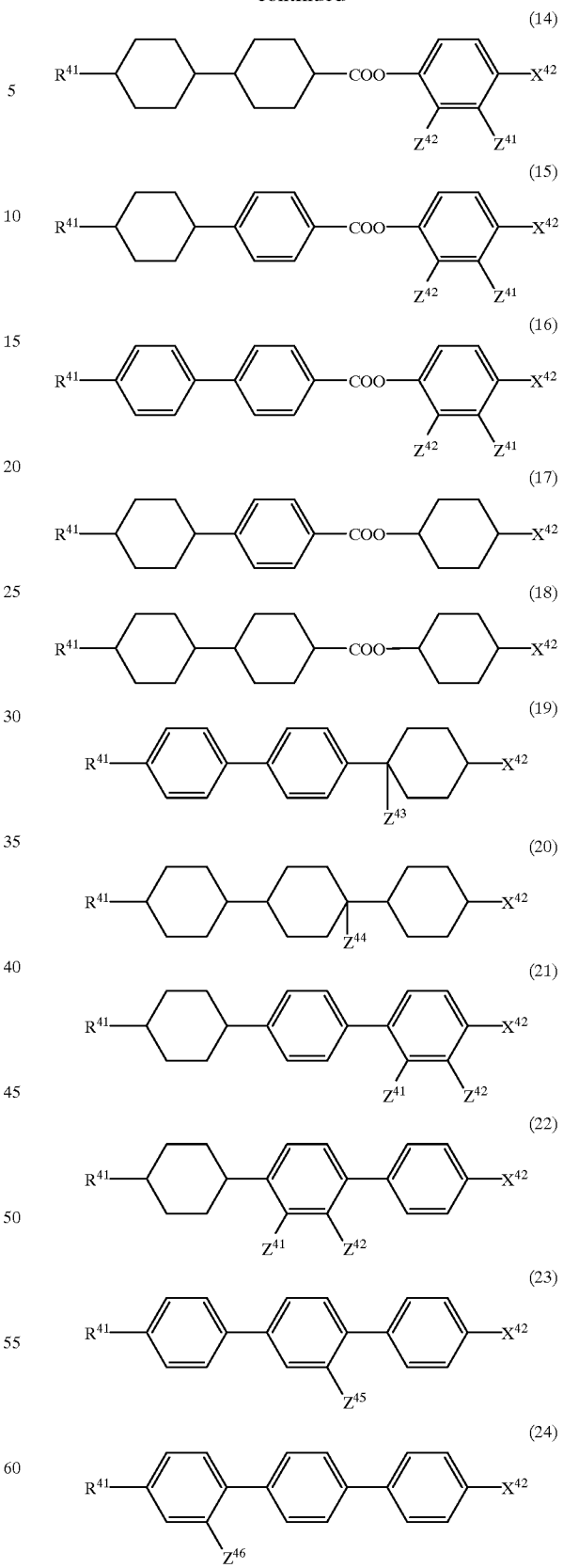

wherein $R^{41}$ represents a linear or branched, alkyl, alkoxy or fluoroalkyl group having from 1 to 10 carbon atoms, an alkoxyalkyl, alkenyl or fluoroalkenyl group having from 2 to 11 carbon atoms, or a substituted cyclohexyl or substituted phenyl group having one or more of these groups as the substituent; $R^{42}$ represents a hydrogen atom, a methyl group, a chlorine atom or a fluorine atom; $X^{41}$ represents a halogen atom, a linear or branched, alkyl, alkoxy, fluoroalkyl, fluoroalkoxy, fluorochloroalkyl or fluorochloroalkoxy group having from 1 to 10 carbon atoms, or an alkoxyalkyl or fluoroalkenyl group having from 2 to 11 carbon atoms; $X^{42}$ represents a linear or branched, alkyl, alkoxy or fluoroalkyl group having from 1 to 10 carbon atoms, or an alkoxyalkyl, alkenyl or fluoroalkenyl group having from 2 to 11 carbon atoms; $Y^{41}$ to $Y^{44}$ each represents a hydrogen atom or a halogen atom; and $Z^{41}$ to $Z^{46}$ each represents a hydrogen atom, a halogen atom or a cyano group, provided that in each of structural formulae (1) to (24), at least one of $X^{41}$, $X^{42}$, $Y^{41}$ to $Y^{44}$, and $Z^{41}$ to $Z^{44}$ is a fluorine atom or a fluorine-containing group.

2. The guest-host liquid-crystal composition as claimed in claim 1, wherein said host liquid-crystal composition further comprises compounds having one or two rings.

3. The guest-host liquid-crystal composition as claimed in claim 1 or claim 2, wherein said fluorine-containing liquid crystal compounds are selected from compounds represented by the formulae (1), (2), (3), (21) or (22).

4. The guest-host liquid-crystal composition as claimed in claim 1 or claim 2, wherein said fluorine-containing liquid crystal compounds are selected from compounds represented by the formulae (1), (2) or (3).

5. The guest-host liquid-crystal composition as claimed in claim 1, wherein the host liquid-crystal composition is a positive nematic (Np) liquid-crystal composition.

6. The guest-host liquid-crystal composition as claimed in claim 1, wherein the host liquid-crystal composition is a negative nematic (Nn) liquid-crystal composition.

7. The guest-host liquid-crystal composition as claimed in claim 1, wherein the dichroic dyes comprise at least one member selected from azo dyes represented by the following general formulae [I] to [III], and wherein the total number of rings represented by

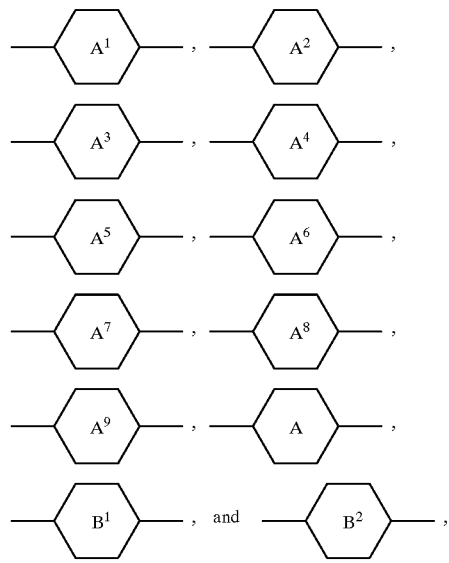

contained in the molecule of the azo dye is 4 or larger and the number of azo bonds (—N═N—) contained in the molecule of the azo dye is from 2 to 6:

[I]

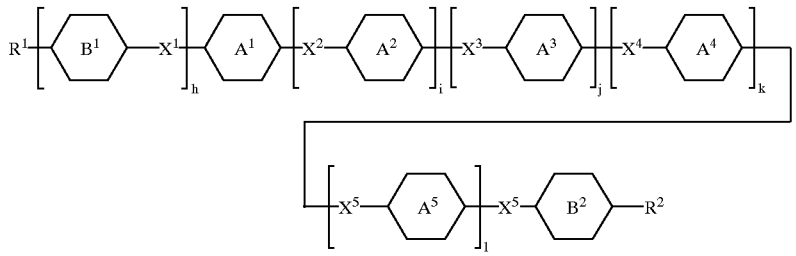

[II]

$D^1$—$D^2$

[III]

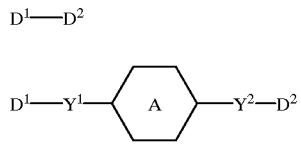

provided that $D^1$ and $D^2$ each independently represents

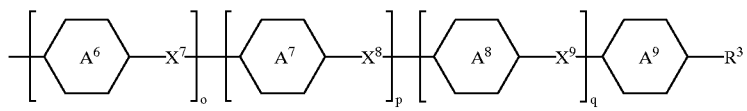

wherein $X^1$ to $X^9$ each independently represents —N=N—, —COO—, —OCO—, —NHCH$_2$—, —CH$_2$NH—, —OCH$_2$—, —CH$_2$O— or a single bond; $Y^1$ and $Y^2$ each represents —COO—, —OCO—, —NHCH$_2$—, —CH$_2$NH—, —OCH$_2$—, —CH$_2$O— or a single bond; $R^1$, $R^2$ and $R^3$ each independently represents a hydrogen atom, an alkyl group, an alkoxyalkyl group, an alkoxy group, a halogen atom, an alkyl, alkoxyalkyl or alkoxy group having a halogen atom as its substituent, or an amino group substituted with any of these groups;

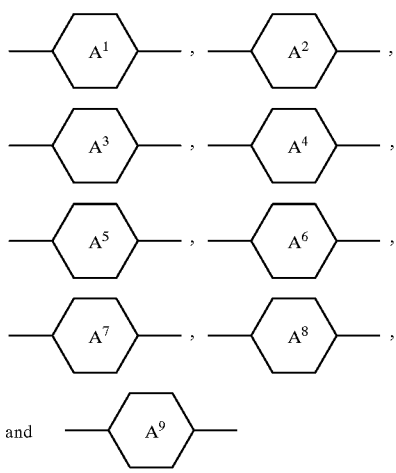

each independently represents

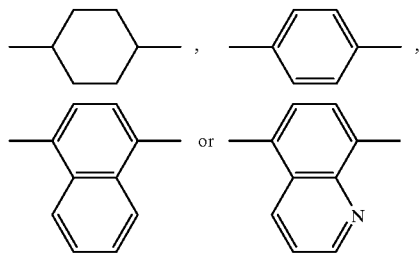

which each may be substituted with any of —F, —Cl, —CH$_3$, —CF$_3$, —OCH$_3$ and —OCF$_3$;

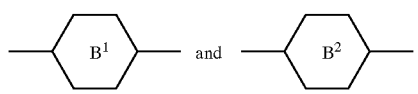

each independently represents

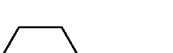

which each may be substituted with any of —F, —Cl, —CH$_3$, —CF$_3$, —OCH$_3$ and —OCF$_3$;

provided that the groups represented by

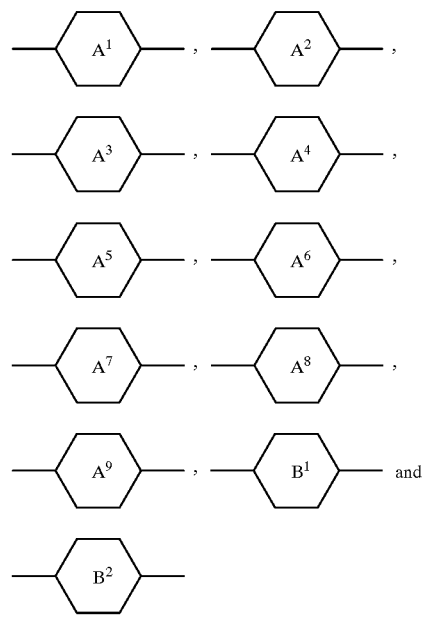

and adjacent to —N=N— each independently represents

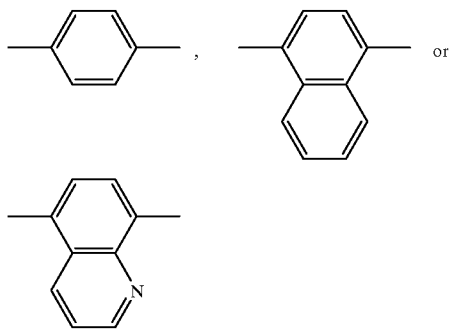

which each may be substituted with any of —F, —Cl, —CH$_3$, —CF$_3$, —OCH$_3$ and —OCF$_3$;

h represents 0 or 1, i represents 0 or 1, j represents 1 to 3, k represents 0 or 1, l represents 1 to 3, o represents 0 or 1, p represents 0 to 2, and q represents 0 to 2; and

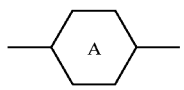

represents

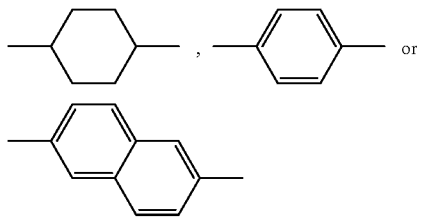

which each may be substituted with any of —F, —Cl, —CH$_3$, —CF$_3$, —OCH$_3$ and —OCF$_3$).

8. The guest-host liquid-crystal composition as claimed in claim 7, wherein the order parameter (S value) at its maximum absorption wavelength ($\lambda_{max}$) is at least 0.80.

9. The guest-host liquid-crystal composition as claimed in claim 7, wherein the order parameter (S value) at its maximum absorption wavelength ($\lambda_{max}$) is at least 0.82.

10. The guest-host liquid-crystal composition as claimed in claim 1, wherein the dichroic dyes comprise at least one anthraquinone dye represented by the following general formula [IV], wherein the total number of rings represented by

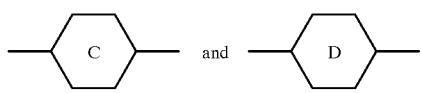

contained in the substituents (X$^{11}$, X$^{12}$, X$^{13}$, Y$^{11}$ and Y$^{12}$) of the anthraquinone skeleton is 1 or larger:

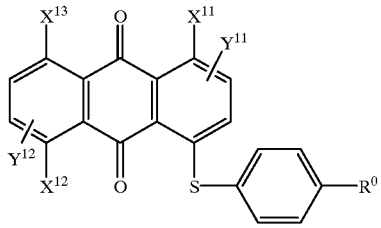

[IV]

wherein X$^{11}$, X$^{12}$, and X$^{13}$ each independently represents —NH$_2$,

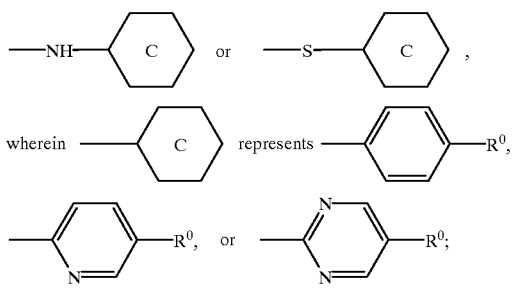

Y$^{11}$ and Y$^{12}$ each independently represents a hydrogen atom, an alkyl group, an alkoxyalkyl group, an alkoxy group, a halogen atom, an alkyl, alkoxyalkyl or alkoxy group having a halogen atom as its substituent,

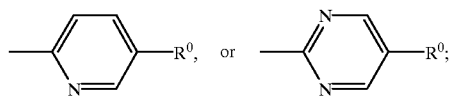

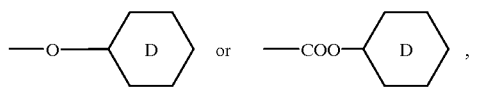

R$^0$ represents a hydrogen atom, an alkyl group, an alkoxyalkyl group, an alkoxy group, a halogen atom, an alkyl, alkoxyalkyl or alkoxy group having a halogen atom as its substituent, or a cyclohexyl or phenyl group which may be substituted with one or more of alkyl groups, alkoxyalkyl groups, halogen atoms and alkoxy groups.

11. The guest-host liquid-crystal composition as claimed in claim 10, wherein the order parameter (S value) at its maximum absorption wavelength ($\lambda_{max}$) is at least 0.78.

12. The guest-host liquid-crystal composition as claimed in claim 10, wherein the order parameter (S value) at its maximum absorption wavelength ($\lambda_{max}$) is at least 0.80.

13. The guest-host liquid-crystal composition as claimed in claim 1, wherein the dichroic dyes comprise at least one anthraquinone dye represented by the following general formula [V]:

[V]

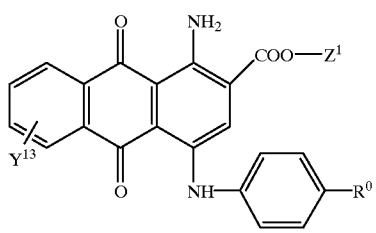

wherein $Y^{13}$ represents a hydrogen atom, an alkyl group, an alkoxyalkyl group, an alkoxy group, a halogen atom, an alkyl, alkoxyalkyl or alkoxy group having a halogen atom as its substituent,

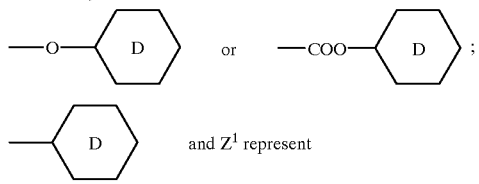

and $Z^1$ represent

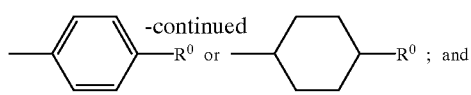

$R^0$ represents a hydrogen atom, an alkyl group, an alkoxyalkyl group, an alkoxy group, a halogen atom, an alkyl, alkoxyalkyl or alkoxy group having a halogen atom as its substituent, or a cyclohexyl or phenyl group which may be substituted with one or more of alkyl groups, alkoxyalkyl groups, halogen atoms and alkoxy groups.

14. The guest-host liquid-crystal composition as claimed in claim 13, wherein the order parameter (S value) at its maximum absorption wavelength ($\lambda_{max}$) is at least 0.78.

15. The guest-host liquid-crystal composition as claimed in claim 13, which has an order parameter (S value) as determined at its maximum absorption wavelength ($\lambda_{max}$) of at least 0.80.

16. The guest-host liquid-crystal composition as claimed in claim 1, wherein the dichroic dyes comprise four dichroic dyes comprising yellow, orange-red, violet and blue dyes, and the guest-host liquid-crystal composition has a black hue,
wherein at least three of the dichroic dyes being dyes selected from the azo dyes shown in claim 6 and from the anthraquinone dyes shown in claims 9 and 12.

17. The guest-host liquid-crystal composition as claimed in claim 16, wherein the order parameter (S value) as determined in a wavelength range of from 470 to 560 nm is at least 0.78.

18. The guest-host liquid-crystal composition as claimed in claim 16, wherein the order parameter (S value) as determined in a wavelength range of from 470 to 560 nm is at least 0.80.

19. The guest-host liquid-crystal composition as claimed in claim 16, containing at least one dichroic dye selected from the following group A (yellow), at least one dichroic dye selected from the following group B (orange-violet), at least one dichroic dye selected from the following group C (violet), and at least one dichroic dye selected from the following group D (blue):

Group A (yellow): Dichroic azo dyes represented by the following general formula [VI]

[VI]

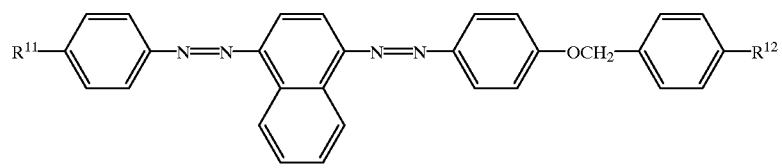

wherein $R^{11}$ represents a hydrogen atom, an alkyl group, an alkoxyalkyl group, an alkoxy group, a halogen atom or a cyclohexyl or phenyl group which may be substituted with one or more of alkyl groups, alkoxy groups, halogen atoms and alkoxyalkyl groups; and $R^{12}$ represents a hydrogen atom, an alkyl group, an alkoxyalkyl group, an alkoxy group or a halogen atom;

Group B (orange-red): Dichroic azo dyes represented by the following general formula [VII]

[VII]

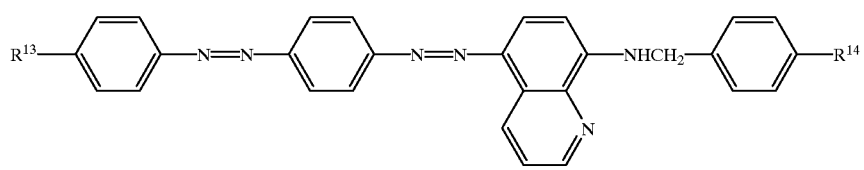

wherein $R^{13}$ and $R^{14}$ represent a hydrogen atom, an alkyl group, an alkoxyalkyl group, an alkoxy group, a halogen atom or a cyclohexyl or phenyl group which may be substituted with one or more of alkyl groups, alkoxy groups, halogen atoms and alkoxyalkyl groups;

Group C (violet): Dichroic azo dyes represented by the following general formula [VIII] and dichroic anthraquinone dyes represented by the following general formula [IX]

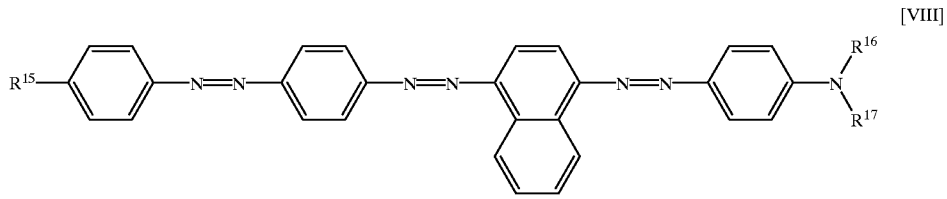

[VIII]

wherein $R^{15}$ represents a hydrogen atom, an alkyl group, an alkoxyalkyl group, an alkoxy group, a halogen atom or a cyclohexyl or phenyl group which may be substituted with one or more of alkyl groups, alkoxy groups, halogen atoms and alkoxyalkyl groups; and $R^{16}$ and $R^{17}$ represent an alkyl group, an alkoxyalkyl group, an alkoxy group, a halogen atom, or a benzyl or cyclohexylmethyl group which may be substituted with one or more of alkyl groups, alkoxy groups, halogen atoms and alkoxyalkyl groups;

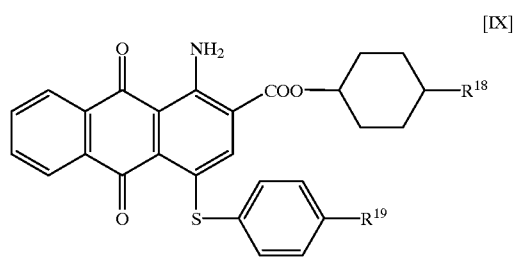

[IX]

wherein $R^{18}$ and $R^{19}$ each represents a hydrogen atom, a halogen atom, an alkyl group, an alkoxyalkyl group, an alkoxy group, or a cyclohexyl or phenyl group which may have one or more of alkyl groups, alkoxyalkyl groups, halogen atoms and alkoxy groups; and Group D (blue): Dichroic anthraquinone dyes represented by the following general formula [X]

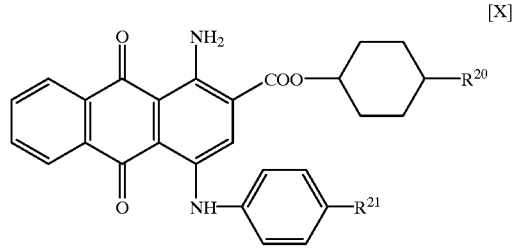

[X]

wherein $R^{20}$ and $R^{21}$ represent a hydrogen atom, an alkyl group, an alkoxyalkyl group, an alkoxy group, a halogen atom, or a cyclohexyl or phenyl group which may be substituted with one or more of alkyl groups, alkoxyalkyl groups, halogen atoms, and alkoxy groups.

20. The guest-host liquid-crystal composition as claimed in claim 16, wherein the contents of the yellow dye, the orange-red dye, the violet dye, and the blue dye are from 10 to 24% by weight, from 4 to 9% by weight, from 3 to 17% by weight, and from 43 to 70% by weight, respectively, based on all the dichroic dyes.

21. The guest-host liquid-crystal composition as claimed in claim 1, wherein the dichroic dyes comprise three dichroic dyes comprising yellow, red-violet and blue dyes, and the guest-host liquid-crystal composition has a black hue, at least two of the dichroic dyes being dyes selected from the azo dyes shown in claim 6 and from the anthraquinone dyes shown in claims 9 and 12.

22. The guest-host liquid-crystal composition as claimed in claim 21, wherein the order parameter (S value) as determined in a wavelength range of from 470 to 560 nm is at least 0.78.

23. The guest-host liquid-crystal composition as claimed in claim 21, wherein the order parameter (S value) as determined in a wavelength range of from 470 to 560 nm is at least 0.80.

24. The guest-host liquid-crystal composition as claimed in claim 1, wherein the incorporation amount of the dichroic dyes is from 0.1 to 15% by weight based on the amount of the host liquid-crystal composition.

25. A reflection type active-matrix liquid-crystal display element which is capable of multicolor-displaying, and which comprises a phase transition type guest-host liquid-crystal composition sandwiched between a transparent electrode substrate having a color filter for three primary colors and an electrode substrate having a reflective layer, wherein the liquid-crystal composition comprises the guest-host liquid-crystal composition as claimed in claim 1.

* * * * *